(12) United States Patent
Merati

(10) Patent No.: US 11,783,663 B2
(45) Date of Patent: Oct. 10, 2023

(54) LIVE ROULETTE HYBRID GAMING SYSTEM AND METHOD

(71) Applicant: UPLAY1, San Diego, CA (US)

(72) Inventor: Bruce Merati, San Diego, CA (US)

(73) Assignee: Uplay1, Las Vegas, NV (US)

(*) Notice: Subject to any disclaimer, the term of this patent is extended or adjusted under 35 U.S.C. 154(b) by 124 days.

(21) Appl. No.: 17/359,938

(22) Filed: Jun. 28, 2021

(65) Prior Publication Data

US 2021/0350655 A1 Nov. 11, 2021
US 2023/0267796 A9 Aug. 24, 2023

Related U.S. Application Data

(60) Division of application No. 16/377,918, filed on Apr. 8, 2019, now Pat. No. 11,049,357, which is a continuation-in-part of application No. 16/149,959, filed on Oct. 2, 2018, now Pat. No. 10,255,753, which is a division of application No. 15/904,327, filed on Feb. 24, 2018, now Pat. No. 10,089,820, which is a division of application No. 15/630,834, filed on Jun. 22, 2017, now Pat. No. 9,905,074, which is a division of application No. 15/407,756, filed on Jan. 17, 2017, now Pat. No. 9,842,459, which is a division of application No. 14/810,467, filed on Jul. 27, 2015, (Continued)

(51) Int. Cl.
*G07F 17/32* (2006.01)
*A63F 13/30* (2014.01)
*A63F 9/24* (2006.01)

(52) U.S. Cl.
CPC ............ *G07F 17/3213* (2013.01); *A63F 9/24* (2013.01); *A63F 13/30* (2014.09); *G07F 17/326* (2013.01); *G07F 17/329* (2013.01); *G07F 17/3223* (2013.01); *G07F 17/3225* (2013.01); *G07F 17/3244* (2013.01); *G07F 17/3293* (2013.01); *A63F 2009/2488* (2013.01)

(58) Field of Classification Search
USPC ........................................................ 463/19
See application file for complete search history.

(56) References Cited

U.S. PATENT DOCUMENTS

2007/0135194 A1* 6/2007 Nicely .................... G07F 17/32
273/292
2007/0246883 A1* 10/2007 Cudlipp .............. G07F 17/3213
273/144 R (Continued)

*Primary Examiner* — Pierre E Elisca
(74) *Attorney, Agent, or Firm* — Thibault Patent Group

(57) ABSTRACT

A method and apparatus for providing hybrid draw poker games to online players, poker hands comprise both physical card values dealt by a dealer and electronically-generated card values from the gaming server. The gaming server receives an indication from each of the remote players of how many hands each player would like to play, and a wager amount for each hand. Electronic indications of an initial set of physical cards dealt by the dealer are then provided to the online players. In response, each player provides an indication of card values that each player would like to retain and/or an indication of card values that each player would like to discard. The gaming server assigns the retained card values selected by each player to each player's respective hands, and then generates electronic replacement card values for each hand of each player. The gaming server then performs a win/lose analysis for each hand.

6 Claims, 19 Drawing Sheets

Related U.S. Application Data now Pat. No. 9,545,569, which is a division of application No. 13/457,414, filed on Apr. 26, 2012, now Pat. No. 9,092,935, which is a continuation-in-part of application No. 13/424,893, filed on Mar. 20, 2012, now Pat. No. 8,414,401, which is a division of application No. 13/245,682, filed on Sep. 26, 2011, now Pat. No. 8,162,760.

(56) References Cited

U.S. PATENT DOCUMENTS

| | | | | |
|---|---|---|---|---|
| 2008/0076534 A1* | 3/2008 | Iddings | ............... | G07F 17/3232 463/25 |
| 2009/0253498 A1* | 10/2009 | Wolf | ................. | G07F 17/32 463/29 |
| 2012/0329543 A1* | 12/2012 | Nicely | ................ | G07F 17/3293 273/292 |
| 2016/0155296 A1* | 6/2016 | Baron | ................... | G07F 17/322 463/25 |

* cited by examiner

LIVE ROULETTE HYBRID GAMING SYSTEM AND METHOD

CLAIM OF PRIORITY

This application is a divisional of U.S. patent application Ser. No. 16/377,918, filed on Apr. 8, 2019, which is a continuation-in-part of U.S. patent application Ser. No. 16/149,959 filed on Oct. 2, 2018, now U.S. Pat. No. 10,255,753, which is a divisional of U.S. application Ser. No. 15/904,327, filed on Feb. 24, 2016, now U.S. Pat. No. 10,089,820, which is a divisional of U.S. application Ser. No. 15/630,834, filed on Jun. 22, 2017, now U.S. Pat. No. 9,905,074, which is a divisional of U.S. application Ser. No. 15/407,756, filed on Jan. 17, 2017, now U.S. Pat. No. 9,842,459, which is a divisional of U.S. application Ser. No. 14/810,467 filed on Jul. 27, 2015, now U.S. Pat. No. 9,545,569, which is a divisional of U.S. patent application Ser. No. 13/457,414 filed on Apr. 26, 2012, now U.S. Pat. No. 9,092,935, which is a continuation-in-part of U.S. patent application Ser. No. 13/245,682 filed on Sep. 26, 2011, now U.S. Pat. No. 8,162,760, all of which are incorporated herein.

BACKGROUND

Field of Use

The present application relates to the field of gaming. More specifically, the present application relates to a system and method of providing gaming services to game players located remotely from one another.

Description of the Related Art

Gambling over the Internet has gained widespread popularity all over the world. Especially prevalent are a variety of poker games such as Texas Hold 'Em, stud, and draw poker. A central gaming server typically hosts these games, providing a virtual gaming environment that includes an electronic representation of these games, including account creation, player registration to play games, and other necessary elements in order for players to participate in these games. Sometimes players play against the "house" or "dealer" (for instance, in blackjack) and sometimes players play against each other (such as any variety of poker). Players typically register with a central gaming server offering such gaming opportunities, fund an account, and then play the games offered in hopes of winning money.

Typically, gaming servers use one or more electronic random number generators (RNG) to generate random numbers for use in these games. For example, an RNG may be responsible for randomly generating electronic representations of physical playing cards, randomly generating icons for use in a slot game, randomly generating dice values, etc. The gaming servers incorporate these randomly-generated values into the various games using a virtual gaming environment, e.g., a software application running on the gaming server, client devices associated with remote players, or both. The gaming server controls game play, including receipt of wagering information, score keeping, accounting, and win determination.

One problem with Internet gambling is one of trust. Many people do not participate in online gambling, because they do not trust that the games are truly random or that the results are being manipulated in favor of other players or the house.

Another problem with Internet gaming is that players are typically isolated from one another, reducing the excitement that live gaming offers.

It would be desirable to provide a gaming system available to players who are remotely located from each other that also instill a greater degree of trust in players than present day systems, while also allowing a higher level of excitement for such players. It would also be desirable to offer such a gaming system via already popular social networks, such as Facebook, Google plus, MySpace, etc.

SUMMARY

The embodiments described herein relate to methods and apparatus for providing hybrid draw poker. In one embodiment, a method is described that is performed by a gaming server, the method comprising receiving, by a processor via a communication interface, electronic indications of an initial sub-set of physical playing cards dealt from a deck of physical playing cards, receiving, by the processor via the communication interface, a first indication from a remote game player of a number of poker hands to be played, generating, by the processor, electronic replacement card values for one or more of the poker hands, and conducting, by the processor via the communication interface, a game of draw poker for each of the poker hands, each poker hand comprising at least some of the electronic indications of the initial sub-set of physical playing cards and one or more electronic replacement card values generated by the processor.

In another embodiment, a gaming server is described, comprising a communication interface for sending and receiving game-related information over a network, a memory for storing processor-executable instructions, and a processor, coupled to the communication interface and the memory, for executing the processor-executable instructions that causes the gaming server to receive, by the processor via the communication interface, electronic indications of an initial sub-set of physical playing cards dealt from a deck of physical playing cards, provide, by the processor via the communication interface, the electronic indications of the initial sub-set to a remote game player, receive, by the processor via the communication interface, a first indication from the remote game player of a number of poker hands to be played, generate, by the processor, electronic replacement card values to one or more of the poker hands, and conduct, by the processor via the communication interface, a game of draw poker for each of the poker hands, each poker hand comprising at least some of the electronic indications of the initial sub-set of physical playing cards and one or more of the electronic replacement card values generated by the processor.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

Figure 1:
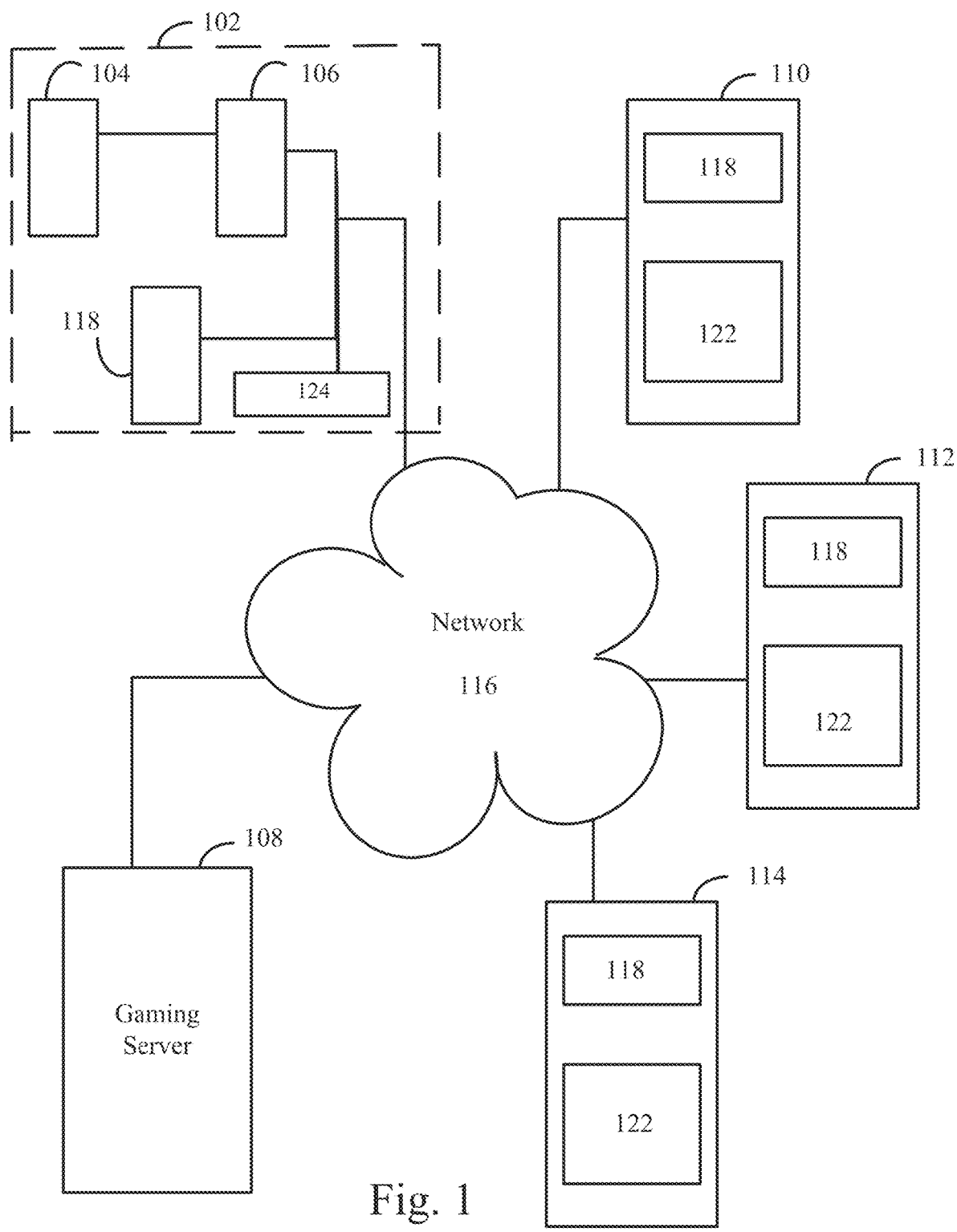
FIG. 1 illustrates one embodiment of a gaming network.

The ideas presented herein relate to various embodiments of methods and apparatus for providing multi-table gaming services that allow one or more players to participate in two or more games simultaneously. For example, a celebrity may choose to play multiple games of Texas Hold 'Em against remote players at one or more virtual gaming tables, as discussed later herein. Such a system and method may be used in conjunction with various social networking phenomenon to create a new wave of developments that involves a combination of live and virtual gaming as the foundation for next-generation of internet gaming that might be referred to as Internet Gaming 2.0

In one embodiment, a celebrity or other person may play multiple games against a plurality of players assigned to one or more virtual and/or physical gaming tables by a central gaming server. The celebrity may play at an authorized gaming establishment, for example at a physical card table inside a casino, hosted by a by a live dealer. The values of the celebrity's cards, as well as any contingent or community card values, are provided to the central gaming server, so that they may be excluded from consideration of being provided to other players during game play. In another embodiment, the celebrity could play "on-line" against other "on-line" players and/or players at a physical gaming table, connecting to the gaming server via a network-enabled electronic device over the Internet or an Intranet, for example. In this case, card values may be provided by either the gaming server, by mechanically-generated means at a location, such as an authorized gaming establishment, or a combination of the two. Players other than the celebrity may play via respective network-enabled electronic devices in communication with the central gaming server and/or play at a physical gaming table with a live dealer providing physical cards to the players.

In one embodiment, hybrid gaming services (defined in [0024] below) comprise games of chance that use mechanically-generated game values, including mechanically-generated, contingent game values, during game play. "Contingent" game values refer to game values that may or may not be used during game play. Whether these values are used depends on one or more factors, such as the value of players' card hands at various times during game play, the value of a dealer's card hand during various points of game play, whether any players remain after an initial round of betting (such as what may occur during Texas Hold 'Em), whether the dealer's hand requires contingency cards to complete a game play (such as in blackjack, dealer drawing cards until achieving a value of seventeen or more), etc. The number of contingent game values generated in a game ensures that each remote game player, and/or a dealer, is able to complete game play. Contingent game values may be used by one or more remote game players and/or by a "house entity", such as a dealer. In one embodiment, each contingency game value is provided to each remote game player. In another embodiment, remote game players receive different contingency values than contingent values provided to other players. In yet another embodiment, some remote game players receive a sub-set of contingency values while other remote game players receive a different sub-set of contingency values. The sub-sets may overlap.

In another embodiment, hybrid gaming services comprise using mechanically-generated game values and electronically-generated game values during game play. This may be referred to as "hybrid gaming". In one embodiment of hybrid gaming, remote game players are provided "player" game values comprising mechanically-generated game values, electronically-generated game values, or both, and a final game result for each remote game player is determined using the contingent game values and player game values.

Mechanically-generated game values are provided by a mechanical device, often in control by a human being, while electronically-generated game values are provided by a processor in combination with executable instructions stored in a memory. An electronic random number generator (RNG) is typically used in conjunction with the processor to generate electronic, random game values during game play.

An example of a mechanical device that generates mechanical game values is a deck of physical playing cards. As cards are dealt from the deck, typically by a human dealer, random card values are generated, each random card value corresponding to an actual card that was dealt. Another example of a mechanical source is a mechanical roulette wheel. Random values are generated as a small ball falls onto a colored, numbered space on the wheel as the wheel is spun by a live croupier. Yet another example of a mechanical device is a cage that is filled with numbered balls, wherein the balls are randomly arranged by turning the cage or providing blown air to the cage, and wherein one of the balls is randomly selected, either by one of the balls falling through an orifice in the cage, or by random selection by the real caller. Still yet another example of a mechanical device is one or more die or dice. Still yet another example of a mechanical device comprises a robot dealing a deck of physical playing cards.

A source of electronically-generated game values may comprise a random number generator (RNG) or a pseudo RNG that provides random values to remote players. RNGs or pseudo RNGs are well-known in the art and typically comprise a processor and executable code instructing the processor to generate random numbers. The electronic source, in general, comprises any device able to generate random values electronically.

FIG. 1 illustrates one embodiment of a system 100 for providing gaming services to remote game players. Location 102 comprises a location, such as a television studio, casino, home, office, or virtually any other physical location. Mechanical device 104, detector 106, and dealer interface 118 are typically located within location 102. Mechanical device 104 acts as a real source of generating random values, comprises virtually any mechanical device capable of generating real, random values, for example, numbers, letters, alpha-numeric characters, icons, colors, symbols, card suits, dice, keno or bingo balls or any other representation of a value. The real, random values could also comprise a combination of the foregoing, such as a color, a number, and a suit, such as the queen of hears from a deck of playing cards, wherein hearts and diamonds are colored red.

Examples of mechanical device 104 include a deck of traditional or non-traditional playing cards, one or more die or dice, a cage with a plurality of uniquely-identifiable objects, a roulette wheel and ball, a receptacle having a plurality of uniquely-identifiable representations, such as raffle tickets, business cards, lottery tickets, or simply uniquely-identifiable pieces of paper, a robot, or any other mechanical device capable of generating real, random information.

In one embodiment, mechanical device 104 generates real, random values with the aid of a human being. For example, if mechanical device 104 comprises a deck of playing cards, a human being, such as a dealer, may generate real, random values simply by selecting one of the cards from the deck of playing cards. In the case of a cage filled with uniquely-identifiable objects, a person may select the objects at random by reaching into the cage or may otherwise remove an object for presentation to the detector 106.

In other embodiments, real, random values may be generated without the aid of human intervention. For example, one or more uniquely-identifiable balls may be selected from a cage of similar, randomly-arranged balls using an air blower and a hole that is sized to roughly the diameter of the balls. The air blower randomly distributes the balls in the cage with the expectation that at least one ball will find its way through the hole. The ball may then be identified by the detector 106. Some bingo, keno and lottery systems operate in this manner.

Detector 106 comprises any electronic or optical device that captures events generated by a real-world, actual source and converts them into electronic signals. For example, detector 106 may comprise a still or video camera and/or a microphone. In another embodiment, a manual entry device may be used by a live person, such as a keyboard, a mouse, and/or other manual entry device. The electronic signals may then be provided to gaming sever 108 located either locally to detector 106 or in a remote location.

In another embodiment, detector 106 comprises an electronic card reader that detects the value of cards (e.g., six of hearts, Ace of spades, etc.) as they are passed over, or come in proximity to, an optical or electronic sensor. The electronic card reader may be incorporated into a "shoe", which is a common apparatus in casinos for housing one or more decks of physical playing cards. The shoe allows dealers to distribute cards to players by sliding cards one at a time from the shoe. As cards are removed from the shoe, one at a time, cards are directed over the optical sensor and a value of the card is generated electronically. In another embodiment, detector 106 is housed within the shoe and senses cards as they are dealt from the shoe. In a related embodiment, detector 106 comprises an RFID reader that is used in conjunction with playing cards each having an RFID chip embedded or located on the cards. As each of these cards is brought within close proximity of the RFID reader, their values may be read by the RFID reader. In yet another embodiment, detector 106 comprises a bar code scanner, where each of the cards comprises a bar code that is used to identify card values. In yet another embodiment, detector 106 includes a Near Field Communication (NFC) technology.

In another embodiment, detector 106 combines both functions of capturing real events as they occur and determining a value created from the real event. For example, a movie camera could receive real audio and visual information of playing cards as they are dealt from a deck of cards and interpret this information to provide values corresponding to values generated by the real source. For example, a camera having image recognition technology could determine that the "eight of spades" or "jack of clubs" has been dealt by a human dealer from a deck of physical playing cards.

Dealer interface 118 comprises an electronic device that allows a dealer at location 102 to communicate with gaming sever 108. It typically comprises one or more well-known techniques to provide information to, or receive information from, server 108, such as a touchscreen computer, smartphone, keyboard, keypad, display device, microphone, etc. For example, gaming server 108 may be programmed to require a players to make decisions during game play, such as betting, folding, raising, whether to receive further cards, etc., within a predetermined maximum time period. Dealer interface 118 may provide a dealer at location 102 with the capability of altering the default game speed. For example, during game play, players may send a request to dealer interface 118 requesting that game play be speeded up. If the dealer receives several of such requests, he or she may decide to increase the speed of play by reducing the default maximum time period for players to make decisions during game play. Game play could be slowed down in another scenario. Further, the dealer could pause game play when desired by indicating so using dealer interface 118.

Dealer interface 118 can also be used to receive information from gaming server 108, such as an indication to begin dealing cards, to show cards to a camera, or for the dealer to perform other actions.

Dealer interface 118 can further be used to communicate with players, either directly or through gaming server 108. For example, emails, text messages blogs or posts may be sent between the dealer and players.

Dealer interface 118 communicates with gaming server 108 via communication network 116, and to and from players either directly via communication network 116 or other network (such as a cellular telephone network), and/or via communication network 116 and gaming sever 108. The dealer may control the flow of a game using interface 118. For example in the game of Texas Hold 'Em, the dealer may use interface 118 to communicate with the gaming server to manage various steps of the game such as starting a new game, dealing virtual cards to each player, initiating a round of betting, exposing virtual presentations of the flop, turn and river cards, determining the outcome of the game, etc.

Location 102 may comprise two or more detector types. For example, a first detector 106 may be used to capture audio and visual information of a real dealer dealing a game of blackjack and provide video and audio signals to players. In addition, a second detector 106 comprising an optical card reader located within a card shoe may detect card values as cards are dealt from the shoe by the dealer. Both the electronic signal representing the audio/visual information and the card values are typically sent to gaming sever 108.

Gaming sever 108 comprises one or more electronic processors for receiving the information sent by detector(s) 106 and for providing games of chance to a potentially large number of game participants via electronic devices operated by each game participant, for example a first electronic device 110 associated with a first game participant, a second electronic device 112 associated with a second game participant, through an $n^{th}$ electronic device 114 associated with an $n^{th}$ game participant.

Each of the electronic devices used by the players typically provides two-way communication with gaming sever 108, such as a computer or a smartphone, over at least one communication network 116. The representative electronic devices 110 through 114 shown in FIG. 1 typically comprise at least a display 122 and a user interface 120, such as a keypad, keyboard, mouse, voice or gesture recognition, still camera, video camera, and/or microphone for allowing players to interact with each other, as well as a speaker/amplification system.

Electronic devices 110-114 may be supplemented with another device such as a television or any other broadcasting technologies for providing audio and video of real events occurring at location 102 (for example, a dealer dealing physical playing cards). In this example, game play and wagering may occur using a home or mobile computing device such as a computer or smartphone, while a real audio/video feed of the game being dealt by a real dealer at location 102 is provided by a television. Thus, in one embodiment, players could use a texting application running on a smartphone to join games, provide wagering information and game decisions, and receive game results and payout information, while watching real action of the game on a television, computer, or another application on the smartphone.

For example, an individual may find a game that he or she would like to play using a computer or smartphone to view available games offered by a gaming server on a website. The gaming server may offer a list of games and associated codes or icons via the gaming website. For example, a game of blackjack could be listed as code '3387336' which may be joined by texting this code to the gaming server via a texting application running on a smartphone; or if an icon is used by clicking on the icon. The individual may join the game of blackjack by providing identification information to the gaming server, such as a unique username and password. After joining the game, the individual may place wagers via text, then receive a textual representation of two, computer-generated player cards plus one real dealer card, the dealer card generated at location 102 by a real dealer using a real deck of cards. The individual may watch the real action at location 102 via television or streaming video to a computer. The individual may then indicate whether they would like another card or whether they wish to "stick" via text, then receive an indication via the text messaging application of the dealer's cards as the dealer completes his hand. The individual's interaction with the game server could be via a voice recognition system. The individual may also view real-time or near real-time video of the dealer as he or she completes the dealer's hand. Results, including an updated account balance of the game may then be provided to the individual via text, email, a web page, TV, radio, a social networking system such as Twitter, by regular mail or any other messaging service.

Returning back to FIG. 1, gaming sever 108 provides a virtual gaming environment for each game participant, each virtual gaming environment dependent upon a particular game of chance being offered. For example, gaming sever 108 may install an executable application into an electronic device used by game participants that offers visual and/or audio representations of one or more games of chance. In another embodiment, gaming server 108 executes many of the functions of the virtual game locally and an application running on a player electronic device acts as a thin client. As game play progresses, gaming server 108 provides updates to the gaming environment, such as the results or values of real events occurring at location 102, account balances, electronically-generated random values, win/loss determination, player alerts, and/or status information pertaining to the game. Thus, the term "virtual gaming environment" refers, generally, to an electronic representation of a game of chance, including audible, visual, and/or textile presentations of such a game to players via an electronic device used by each player. For example, processor 200 may generate a rendered gaming table with visual images, pictures or videos of other players occupying places around the table. The processor 200 may additionally provide music or sound effects through the player's electronic device before, during, or after game play. Processor 200 additionally generates player values using an RNG and provides these values to players in accordance with the particular game being played. Finally, processor 200 may provide a video display of real events occurring at location 102.

Communication network 116 is used to provide information among the various entities comprising the system 100, such as detector 106, gaming sever 108 and electronic devices 110 through 114. Communication network 116 typically comprises a data network such as the Internet. However, other communication networks may be used alternatively, or in combination, with data networks, including television or radio networks, satellite communication networks, fiber optic or wireless networks, and/or virtually any other communication network. Throughout this specification, reference to communication network 116 is a reference to communication networks in general and does not imply a particular type in any situation. Further, various types of information pertaining to game play be provided to, or received from, entities over more than one type of communication network. For example, an audio/video signal representing a dealer's hand in a game of blackjack at location 102 could be provided to a player using a television network, while the player's hand could be randomly-generated by processor 200 and provided to the player over the Internet.

Figure 2:
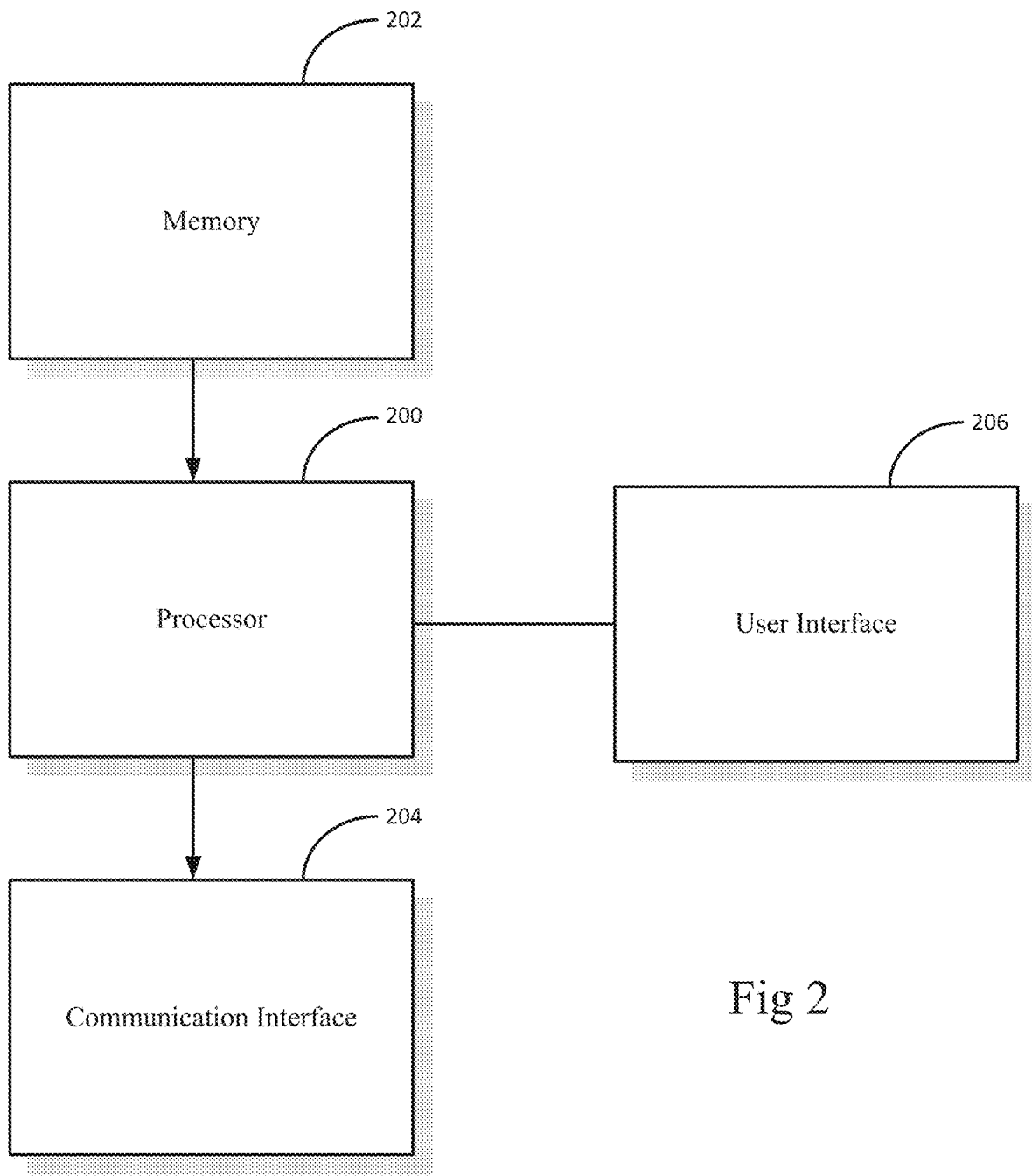
FIG. 2 illustrates a functional block diagram of one embodiment of a gaming sever used in the gaming network of FIG. 1.

FIG. 2 illustrates a functional block diagram of one embodiment of gaming sever 108. Specifically, FIG. 2 shows processor 200, memory 202, communication interface 204, and optional user interface 206. It should be understood that the functional blocks shown in FIG. 2 may be connected to one another in a variety of ways, and that not all functional blocks necessary for operation of gaming sever 108 are shown (such as a power supply) for purposes of clarity.

Processor 200 is configured to provide general operation of gaming sever 108 by executing processor-executable instructions stored in memory 202, for example, executable code, to provide games of chance to remote game players. Processor 200 is typically a general purpose processor, such as any one of a number of Pentium® class microprocessors manufactured by Intel Corporation of Santa Clara, Calif.

Memory 202 comprises one or more information storage devices, such as RAM, ROM, EEPROM, UVPROM, flash memory, CD, DVD, Memory Stick, SD memory, XD memory, thumb drive, or virtually any other type of memory device. Memory 202 is used to store the processor-executable instructions for operation of gaming sever 108 as well as any information used by processor 200, such as instructions for processor 200 to provide game updates to players as play progresses, to incorporate real values provided by detector 106 into virtual gaming environments, to receive wagering information from game participants, to provide account information for game participants, and for storing parameter information, status information, etc.

Optional user interface 206 may be coupled to processor 200 that allows an individual access to information stored in memory 202, as well as to provide updates to this information and/or to gaming software. User interface 206 may comprise one or more pushbuttons, switches, sensors, touchscreens, keypads, keyboards, ports, and/or microphones that generate electronic or voice signals for use by processor 200 upon initiation by a user. User interface 206 may additionally comprise one or more seven-segment displays, cathode ray tubes (CRT), liquid crystal displays (LCD), or any other type of visual display for display of information to users. Of course, the aforementioned items could be used alone or in combination with each other and other devices may be alternatively, or additionally, used. User interface 206 may be used, for example, by an administrator to update game software stored in memory 202, to manually manage user account information, to change payout information, or for any other reason.

Communication interface 204 comprises circuitry necessary for processor 200 to communicate over one or more networks, such as data networks, television networks, satellite networks, cellular networks, etc. Such circuitry is well known in the art.

Figure 3:
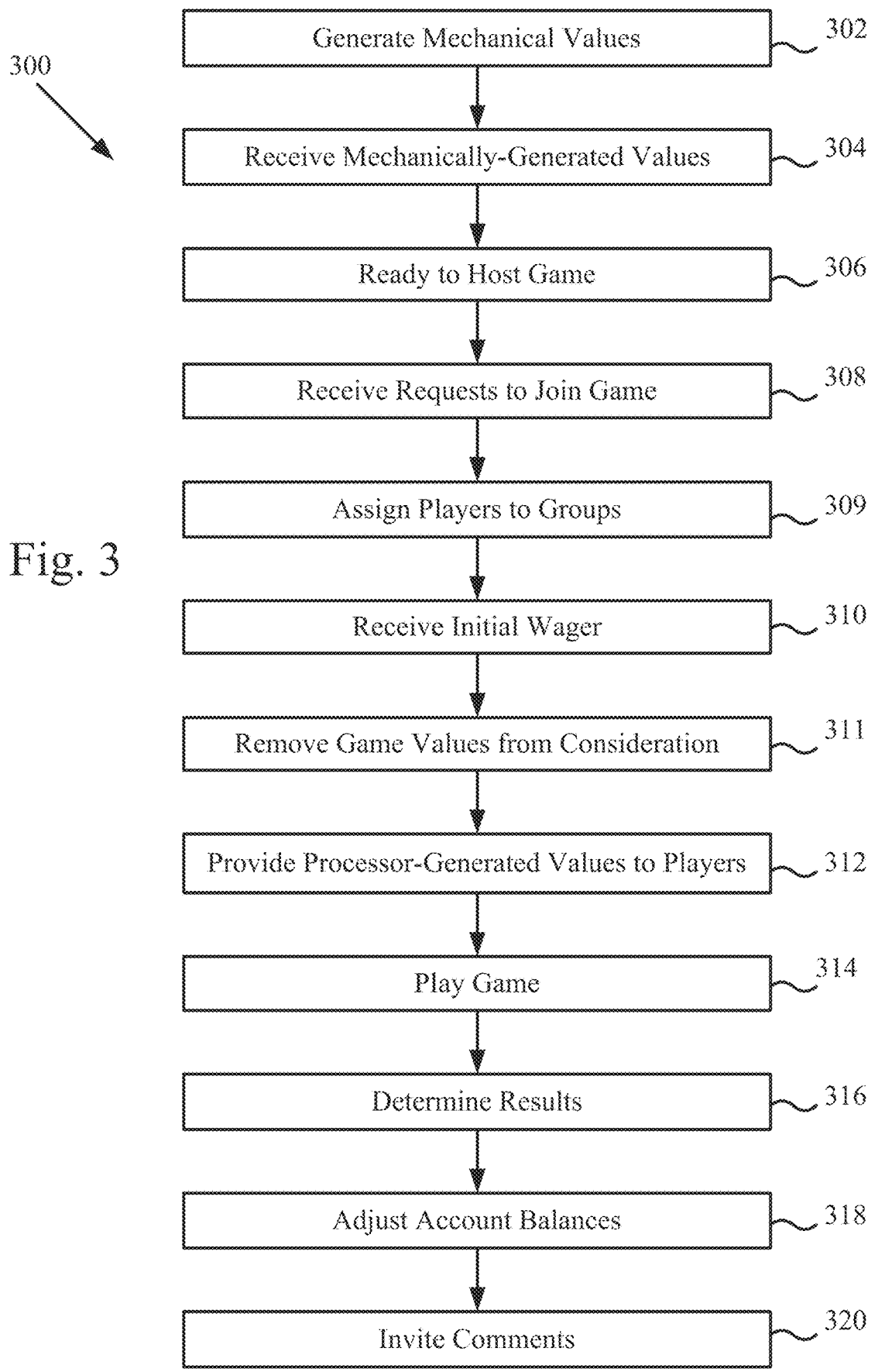
FIG. 3 is a flow diagram illustrating one embodiment of a method for providing gaming services to remote game players.

FIG. 3 is a flow diagram illustrating a general embodiment of a method 300 for providing gaming services to remote game players. Method 300 serves as a general example of gaming services from which more specific embodiments may be based, such as the methods described with reference to FIGS. 4-11. Method 300 describes how mechanically-generated game values are used by gaming sever 108 to offer an electronic game to remote game players. The mechanically-generated game values are incorporated into an electronic card game offered by gaming server 108. It should be understood that the steps described in this method could be performed in an order other than what is shown and discussed. For example, in this embodiment, the process begins by mechanically-generated values being generated at location 102 and provided to gaming server 108. In another embodiment, however, gaming server 108 may provide an indication to location 102 requesting that mechanically-generated values be generated after a number of players have requested to play a game. Further, it should be understood that gaming sever 108 could be running tens, hundreds, or even thousands of different games simultaneously.

Throughout the process described in FIG. 3, information may be distributed among the various entities of system 100 in order to provide an enhanced gaming experience for the players. For example, in addition to detector 106, a video camera may capture a dealer dealing cards as they are dealt from a physical deck of cards. The dealer may possess attractive qualities that could be conveyed to players using the audio/video information. For example, the dealer may be physically attractive or have a good sense of humor. The dealer could also communicate with players using the audio/video signals. For instance, the dealer could announce the general identity and/or location of a player who has received an unlikely poker hand, such as a royal flush, to other players.

Information could also be sent by players and provided to other players and/or the dealer. In this case, audio/video signals are transmitted by players to gaming sever 108 via communication network 116, and gaming sever 108 may re-distribute the received audio/video signals to some or all of the other players and/or the dealer. For example, players might use a web camera to provide video and/or audio to processor 200. Processor 200 then distributes each audio/video feed to the other players and/or dealer. In this way, players may feel more involved and connected to the other players and the dealer, thereby enhancing their satisfaction with playing various games using system 100. The video/audio signals from the dealer may, additionally, gives players a greater sense of security and satisfaction knowing that the dealer results are generated by a real person dealing physical playing cards or other actual event, as the case may be.

Players may, in addition, communicate via text messaging or social networking between each other, via communication network 116 and gaming server 108 and/or with a dealer at location 102 via communication network 116, gaming server 108, and dealer interface 118.

Returning now to FIG. 3, at block 302, mechanical device 104 generates one or more mechanically-generated game values for use by gaming server 108 to incorporate into a game played by remote game players. Mechanically-generated game values are based on real-world, physical events typically taking place in real-time or near real-time at location 102. For example, the actual, physical event may comprise dealing physical playing cards from a deck of cards, physical balls being drawn from a cage, a physical ball landing on a space on a mechanical roulette wheel, a mechanical slot machine being, or any other event occurring with the aid of a device. An actual, live person may operate mechanical device 104 to generate mechanically-generated game values. Mechanically-generated game values comprise numbers, letters, alpha-numeric characters, icons, colors, symbols, card suits, or any other value that may be used to play a game.

As mechanically-generated game values are generated by mechanical device 104 (with or without human intervention) detector 106, in turn, transmits the mechanically-generated game values to gaming server 108. In other embodiments, raw data relating to the real events (such as a video signal) is transmitted to gaming server 108, or some other processor, where the mechanically-generated game values are determined from the raw data. In any case, the mechanically-generated game values generated at block 302 are received by processor 200 via communication network 116 and communication interface 204 at block 304.

The mechanically-generated game values generated at block 302 may comprise "contingent" or "contingency" cards, defined as mechanically-generated cards needed to complete game play for any potential game scenario that may arise related to different remote game players. The contingency cards are typically dealt prior to players receiving any electronically-generated card values from gaming server 108. They may be removed from further consideration by gaming server 108 so that they are not duplicated as gaming server 108 provides electronically-generated card values to players during game play. For example, in a game of hybrid blackjack between two players and a dealer, an initial dealer blackjack hand is dealt comprising two mechanically-generated cards. However, one or more contingency cards are also dealt prior to any players receiving their initial, electronically-generated hands. The contingency cards, in this example, allow the dealer to complete game play for any potential game play scenario. For example, a dealer may draw three or four contingency cards after the dealer's initial two cards are dealt. The value of the initial cards and the contingency cards are excluded from being provided to remote players prior to providing any electronic game values to the remote players. In one embodiment, contingency cards are only put into play if required. For example, the rules of blackjack require all players to complete their hands before the dealer plays his/her hand. If all of players bust, the dealer does not have to receive any further cards, and the players all lose their bets because the dealer does not have to put the contingency cards into play. However, if one of the players did not bust, the dealer would use the contingency cards to reach a value of seventeen or more. It should be understood that the concept of contingency cards can be applied to other games as well. Contingency cards may also be used by players to form final hands or otherwise complete game play.

At block 306, gaming sever 108 offers to host a game for remote game players. The game may comprise one of a number of games offered by gaming sever 108, including bingo, keno, blackjack, baccarat, poker, roulette, or virtually any other game, typically games of chance. Gaming server 108 typically provides a virtual gaming environment to electronic devices used by the players to communicate with gaming server 108. The virtual gaming environment provides everything that players need to play games using gaming server 108, such as a visual representation of a virtual game such as a game table (such as a blackjack table, a Texas Hold 'Em table, etc.), game values (such as cards, dice, bingo balls, etc.), information relating to game play (such as wagers from other players, player status, player actions, etc.), and account management.

Gaming server 108 may offer a card game played on a particular "virtual" table having a fixed number of available positions for players. Alternatively, or in addition, multiple tables may be made available, each table offering the same type of game. In another embodiment, gaming server 108 may offer a game that allows an unlimited number of players to play against a single entity, such as a dealer, or against each other. In another embodiment, gaming server 108 may also offer multiple virtual game tables that offer a variety of games to remote players. Alternatively, or in addition, a single type of game may be offered on multiple virtual game tables, each table offering localized game play to remote players assigned to each table, each table using the same mechanically-generated values generated by mechanical device 104 while receiving electronic, random game values from a unique source, pool, or set of possible game values (such as each table receiving random, electronic values from a respective pool of 52 card values assigned to each table).

At block 308, one or more players provide a request to join one of the games being offered by gaming server 108 at block 306 via electronic devices in communication with gaming sever 108 over communication network 116. The request may comprise a preference to play with a particular dealer, another remote game player identified in the request and/or a preferred virtual table.

At block 309, processor 200 may assign requesting players to one or more groups of players. For example, processor 200 may define a first group of players by assigning the first ten players to request game play at block 308 to a virtual game table and a second group of players by assigning the next ten requesting players to a second virtual game table. Players at both virtual tables use the same mechanically-generated values generated by mechanical device 104 during game play, while each player in the first group receives electronic, random game values from a unique source, pool, or set of possible game values (such as each table receiving random, electronic values from a respective pool of 52 electronic card values assigned to each table), and each player in the second group receives electronic, random game values from a second unique set of possible game values.

In one embodiment, game play begins when a predetermined number of players register to play the game. In another embodiment, play beings after a predetermined time period has expired.

At block 310, an initial wager may be received from one or more game players over communication network 116. Wagering is typically provided by gaming sever 108, allowing players to set up accounts that are funded using credit or debit cards, checks, wire transfers, etc. Players generally draw on their accounts to provide wagers throughout various rounds of play. Processor 200 provides credits to these accounts as players win rounds of play.

In another embodiment, wagers comprise points, or some other form of abstract value, not directly tied to money. For example, a game tournament may be offered where players are provided an account having a predetermined number of points credited for use in wagering. The account is debited for each wager placed and credited after a winning round of play. At the end of the tournament, e.g., after a predetermined time period, number of rounds of play, or elimination of all players except one, the points may be redeemed for cash or prizes.

At block 311, after any wagers have been received, processor 200 receives mechanically-generated game values generated by mechanical device 104 and detected by detector 106.

At block 311, processor 200 removes the mechanically-generated game values received at block 304 from consideration by processor 200 before, or during, a process of providing electronic, random game values to players. This may be accomplished by storing the mechanically-generated game values received at block 304 in memory 202 and then comparing each of these values to values that are electronically selected at random by processor 200 from a potential number of values, for example, in a card game using a single deck of cards, there are 52 values. If the randomly-selected value by processor 200 matches one of the mechanically-generated game values stored in memory 202, that value is discarded and processor 200 randomly selects another game value out of the potential number of values. This process is repeated until a game value is electronically selected that does not match any of the mechanically-generated game values stored in memory 202.

In another embodiment, mechanically-generated game values are removed from consideration from a pool of possible game values available for random selection by processor 200. For example, when real game values are received at block 304, processor 200 excludes, or removes from consideration, these mechanically-generated game values from the potential pool of available values at block 311, leaving processor 200 a reduced pool of candidate game values to choose from.

Other methods for removing, excluding, or eliminating mechanically-generated values may be used in the alternative to the two methods presented above.

At block 312, processor 200 generates electronic, random game values for each player from a first set of possible game values, the first set of possible game values comprising a total possible number of game values minus any mechanically-generated game values received at block 311, and minus any electronic game values that have already been provided to any game players. For example, if at some later part of the game, processor 200 had already received the two of hearts and the six of spades at block 311, and had further electronically generated and provided the ten of diamonds to a first player, then the first set of possible game values would comprise all 52 values in a typical deck of cards, less the two of hearts, the six of spades, and the ten of diamonds.

The process of generating random game values is well-known in the art. In order to exclude game values received at block 311 from being provided to players, processor 200 either eliminates them from consideration prior to the random selection process, or compares them to game values randomly-selected by processor 200, rejecting any electronic game values that match any of the real game values. In any case, processor 200 provides the electronic, random game values to each player via communication network 116.

At block 314, game play occurs. In general, any further card values needed to complete game play are provided by either mechanical device 104/detector 106 or by processor 200 performing the electronic, random game value generation process described above, excluding any mechanically-generated or processor-generated game values already in play. Processor 200 controls game play, typically by providing requests, indications, and/or cues to or from the dealer and/or players to provide responses in the form of game flow (e.g. initiating a betting round) or game play choices (e.g., "hit", "stick", "fold", "call", "raise", wagering amounts, etc.). In some cases, two or more players receiving common mechanically-generated game values from location 102 during game play may not receive all of the mechanically-generated game values generated by mechanical device 104. For example, two players might be playing blackjack against mechanically-generated card values generated by a dealer at location 104. During game play, both players receive the dealer's mechanically-generated "up" card and, in this example, a first player is dealt a "blackjack" as an initial hand, while a second player is dealt an initial hand totaling 9 points. In this case, the first player does not need to receive any further dealer cards. However, if the second player decides to take a "hit", the mechanically-generated card value generated by the dealer may be provided to the second player only, since the first player's hand was complete when he received the blackjack. In another embodiment, contingency card values are additionally provided to players who do not require the contingency card to complete the current round of play, without relevance to the game outcome for such players.

As part of game play at block 314, processor 200 removes each electronically-generated game value when generating/selecting the next electronic, random game value so that game values are not duplicated during game play. In addition, processor 200 may, in one embodiment, provide mechanically-generated game values and/or electronically-generated game values to players as the actual/electronically-generated game values are used in game play, so that players can know which cards have been already used in the game. Game values may be provided to players whether or not they are needed for players to complete game play. These game values may be displayed to players via the virtual gaming environment.

At block 316, processor 200 determines which player or players won the game, based on the scores, values, information, and/or indications of/from each player and/or processor 200.

At block 318, processor 200 adjusts account balances affected by the game results determined at block 316, and may provide updated account balances to players.

At block 320, processor 200 may generate an invitation for winning players to provide comments regarding the previous round of play. In another embodiment, processor 200 provides an indication of winners to the dealer at location 102 via dealer interface 118 and the dealer provides a verbal invitation for winning player(s) to provide comments over communication network 116. In either of the above embodiments, an indication could be provided, either by processor 200 and/or the dealer at location 102, of a general identity and/or location of a player who has received a rare game result, such as receiving a royal flush in a game of draw poker. Winners could respond to the invitation by sending audio/video signals or textual responses to gaming server 108, where they could be forwarded to other game players and/or the dealer. In this way, game players feel more connected to other players and/or the dealer, which may add to their enjoyment of playing games online using gaming system 100.

In another embodiment of method 300 briefly mentioned above, processor 200 may assign players into groups. A group may comprise a single game player. For example, before game play, processor 200 may assign a first number of players who submit a request to play a game to a first virtual gaming table and a second number of players to a second virtual gaming table. Each of the players at both tables play at the same game type using at least some mechanically-generated game values generated at location 102. This allows a single entity at location 102 to provide mechanically-generated game values (e.g., card values) that can be used by a large number of players, many more than would otherwise be possible in a real, live playing environment. For example, in blackjack, it is not prudent to allow more than seven or eight players to play on one table, because the dealer may run out of cards due to the high number of players. This embodiment allows a blackjack dealer, for example, to deal a dealer hand that may be played by tens, hundreds, or thousands of players.

In this embodiment, at least some of the mechanically-generated game values generated at location 102 are provided to both groups of remote game players during game play. In one embodiment, electronic, random game values provided to the first group of remote game players during game play are selected from a first set of possible game values by processor 200, while electronic, random game values provided to the second group of remote game players during game play are selected from a second set of possible game values. The first set of possible game values represents the total possible game values related to the first group of remote game players minus any mechanically-generated game values provided by mechanical device 104 and minus any random, electronic game values that have already been provided to any of the first group of remote game players. The second set of possible game values represents the total possible game values related to the second group of remote game players minus any mechanically-generated game values generated and minus any electronic game values that have already been provided to any of the second group of remote game players.

For example, in a game of Texas Hold 'Em a dealer at location 102 may deal five cards, representing contingent community cards used by players to construct poker hands. The five cards may be considered "contingent", because one or more of them may or may not be used during game play. For example, if all but one of the players fold during an initial round of betting, none of the five cards is used for that round of game play. Using one deck of cards, a maximum of twenty three players can play against each other (2 cards each plus the 5 community cards=51 cards), although in practice, typically only 10 players are allowed. In the present embodiment, the five community cards may be used by two or more groups of players, each group of players using the five community cards. However, each group of players is provided electronic, random cards from their own set of available card values. For example, a first group of 10 players may request game play and be defined and assigned to a first virtual gaming table by gaming server 108 and a second group of 10 players may request game play and be defined and assigned to a second virtual gaming table by gaming server 108 to play Texas Hold 'Em. Each group of players is provided the community cards dealt by a dealer at location 102. However, the first group of players receive electronically-generated cards for their initial hands from a first "electronic deck" of cards, e.g. "set of possible game values", (minus the mechanically-generated cards dealt by the dealer), while the second group of players receive electronically-generated cards for their initial hands from a second "electronic deck of cards, e.g., "set of possible game values", (minus the same mechanically-generated cards provided to the first group of players). Thus, one real, live dealer can provide a game of Texas Hold 'Em to an unlimited number of virtual gaming tables.

FIGS. 4 through 11 illustrate specific implementations of method 300. However, each embodiment comprises several common features, described as follows:

In each embodiment, throughout game play, audio/video signals may be sent by players and provided to other players and/or a dealer. Such audio/video signals may be transmitted by players to gaming sever 108 via communication network 116, and gaming sever 108 may re-distribute the received audio/video signals to some or all of the other players and/or the dealer. For example, players might use a web camera to provide video and/or audio to processor 200. In this way, players may feel more involved and connected to the other players and the dealer, thereby enhancing their satisfaction with playing various games using system 100. The video/audio signals from the dealer may, additionally, gives players a greater sense of security and satisfaction knowing that the dealer results are generated by a real person dealing physical playing cards.

Each embodiment shown in FIGS. 4-11 also contemplates detector 106 comprising a commercially-available card reader that detects card values as cards are brought in close proximity to the card reader. In another embodiment, the dealer shows each card to a detection camera, then lays the cards on the table in either a face up or face down condition. The dealer may, in addition or alternatively, verbally announce the value of each card as it is dealt, for instance, "the nine of hearts", "the king of clubs", etc. for receipt by a first microphone. Signals from both the first camera and the first microphone are provided to gaming server 108. A second camera and/or microphone, focused on the dealer and the cards on the table, provides visual and/or audio signals of mechanically-generated game play without an indication of the value of any hold cards or contingency cards Wagers are placed generally using the virtual gaming environment displayed on the player's electronic device. Wagers are generally deducted from accounts associated with each player. Players generally draw on this account balance to provide wagers throughout multiple rounds of game play. Account balances are updated depending on wager amounts, wins, and losses.

Further, processor 200 allows player interaction via the virtual gaming environment presented to players through one or more electronic devices associated with each player. Players may use the virtual gaming environment via their electronic devices perform a number of tasks, such as to sign into gaming server, register/request game play, create a new account, place wagers, track an account balance, chat with other players, provide player selections during game play, and other tasks. Players may sign into a pre-existing account managed by gaming server 108 using a pre-established user ID and password. Participants who do not have a user ID and password generally create an account with gaming server 108 by providing personal information, such as a name, address, and/or credit card information to gaming server 108. In one embodiment, game play begins when a predetermined number of participants provide a request to processor 200 to play a game. In another embodiment, play beings after a predetermined time period has expired after processor 200 indicates that it is ready to host a game.

Each embodiment shown in FIGS. 4-11 also contemplates processor 200 removing, excluding, or eliminating mechanically-generated game values received from consideration by processor 200 before, or during, a process of providing electronic, random game values to players. This may be accomplished by storing mechanically-generated game values received by processor 200 from location 102 in memory 202 and then comparing each of the mechanically-generated game values to game values that are electronically selected/generated at random by processor 200 from a potential number of values, for example, in a card game using a single deck of cards, 52 possible game values. If the randomly-selected game value by processor 200 matches one of the mechanically-generated game values stored in memory 202, that value is discarded and processor 200 randomly selects another game value out of the potential number of values. This process is repeated until a game value is electronically selected that does not match any of the mechanically-generated game values stored in memory 202.

In another embodiment, mechanically-generated game values are removed from consideration from a pool of possible game values available for random selection by processor 200. For example, when mechanically-generated game values are received at block 311, processor 200 excludes, or removes from consideration, these mechanically-generated game values from the potential pool of available values, leaving processor 200 a reduced pool of candidate game values to choose from.

Other methods for removing, excluding, or eliminating mechanically-generated values may be used in the alternative to the two methods presented above.

Each embodiment shown in FIGS. 4-11 also contemplates the use of dealer interface 118 to allow communications among a dealer, gaming server 108, and/or players, as described above.

Figure 4:
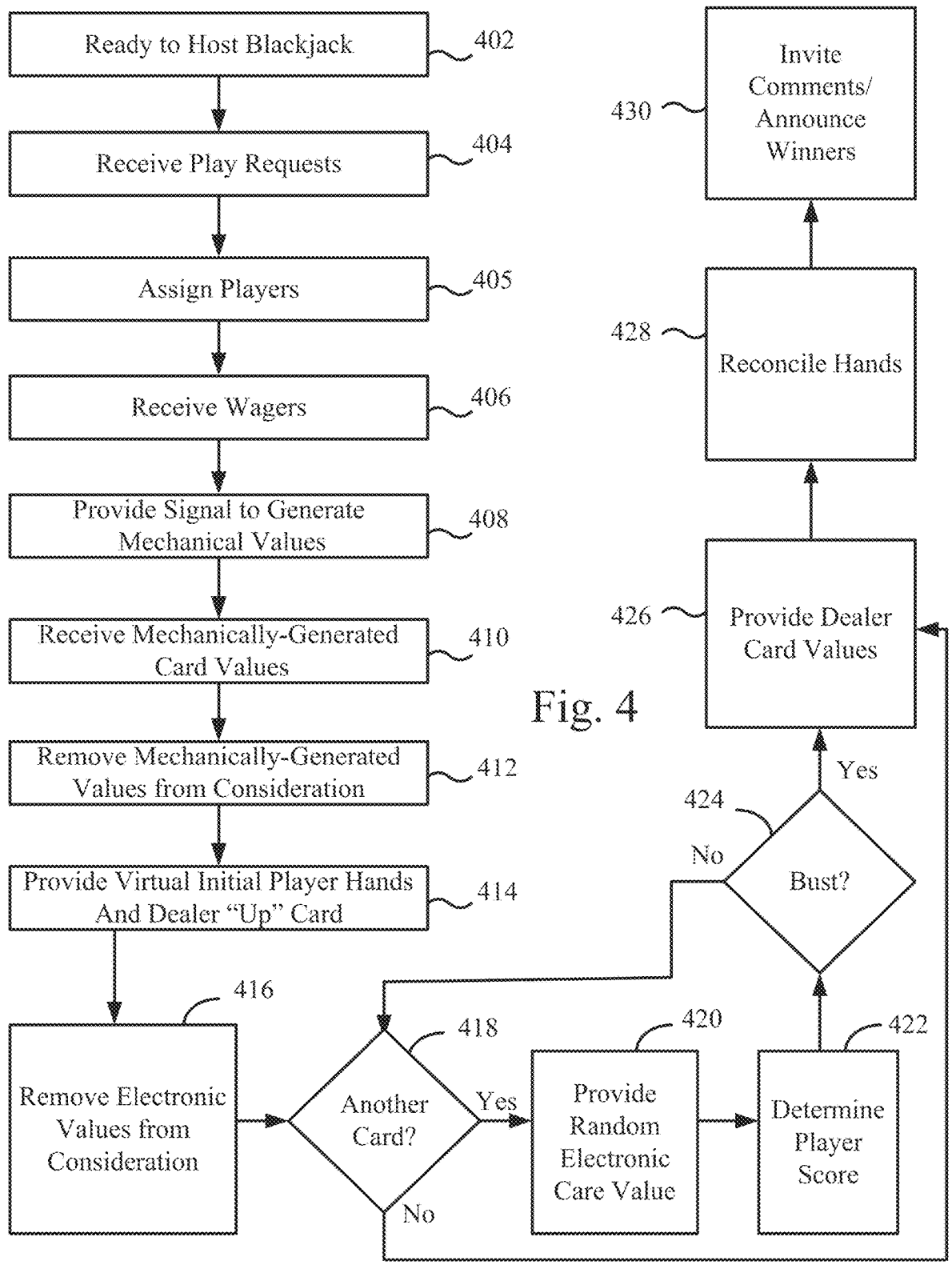
FIG. 4 is a flow diagram illustrating one embodiment of the method of FIG. 3, specifically illustrating a method of how the gaming server of FIG. 2 operates during a hybrid game of blackjack.

FIG. 4 is a flow diagram 400 illustrating the method of FIG. 3, specifically illustrating an embodiment of how a game of hybrid blackjack may be being played using the system of FIG. 1 between 10 remote game players and a dealer. The concepts described with respect to FIG. 4, however, can be applied to a hybrid game of blackjack having a greater, or fewer, number of players, and players may be assigned into groups, as discussed previously herein. It should be understood that the steps described in this method could be performed in an order other than what is shown and discussed. For example, in this embodiment, the process begins by gaming server 108 offering a hybrid game of blackjack to potential remote game players before mechanically-generated card values are generated by a live dealer at location 102. In another embodiment, however, the method could begin by the dealer dealing a number of cards, providing the card values to gaming server 108, then gaming sever 108 offering game play to remote game players.

At block 402, gaming sever 108 provides an indication that it is ready to host one or more games of blackjack, typically by providing such an indication to prospective game players via a respective electronic device operated by each prospective player. The indication may comprise a website listing a number of games currently available for prospective game players to join.

Players may use their electronic devices to sign into, or register with, gaming server 108 using a pre-established user ID and password. Players who do not have a user ID and password generally create an account with gaming server 108 by providing personal information, such as a name, address, and/or credit card information to gaming server 108.

At block 404, ten players request to play one of the games of blackjack offered by gaming server 108. In one embodiment, each player may request to play at a particular virtual gaming table, and/or play blackjack with one or more identified remote game players. Players are assigned to virtual tables by processor 200, using techniques already known in the art. Players interact with gaming server 108 via a virtual gaming environment executed on each player's electronic device. In one embodiment, game play begins when a predetermined number of players request to play blackjack. In another embodiment, play beings after a predetermined time period has expired after processor 200 indicates that it is ready to host a game of blackjack.

At block 406, each player wishing to participate in a current blackjack hand places a wager using the virtual gaming environment displayed on the player's electronic device. Wagers are generally deducted from accounts associated with each player. Players generally draw on this account balance to provide wagers throughout multiple rounds of game play. Account balances are updated depending on wager amounts, wins, and losses.

In block 408, in one embodiment, gaming sever 108 generates and provides a request to location 102, via dealer interface 118 for example, to begin dealing physical playing cards in accordance with the rules of blackjack. The request may comprise an electronic, visual, audible, or other signal provided either directly to mechanical device 104 or to a real, live individual in charge of operating mechanical device 104, such as a dealer dealing physical playing cards. In the latter case, the request from gaming server 108 may be directed to a visual monitor, display, computer, smartphone, indicator light, LED, etc. The request may also include the number of players that are participating in the current round of play. In this example, ten players have been assigned spaces by processor 200 and nine of the players have provided a wager.

In response to receiving the request to begin dealing at block 408, a human dealer at location 102 deals two cards to him or herself from one or more decks of playing cards, representing a dealer hand. Typically, the dealer does not deal cards for the players, as processor 200 provides these hands to the players electronically, as explained below.

In one embodiment, one dealer card is dealt face up and the other card, the "hole" card, is dealt face down. As the cards are dealt, their values are detected by detector 106, whether they are dealt face down or up.

In addition to the two initial cards dealt, the dealer deals a number of additional cards, representing "contingency" cards. The contingency cards are dealt in advance of any player action so that gaming server will know which cards are unavailable for distribution to players when random, electronic cards are generated by processor 200 during game play. The dealer will typically deal as many contingency cards as might be necessary for the dealer to either achieve a fixed result, e.g., a hand between 17 and 21, or until the dealer will potentially bust. Each contingency card is read by detector 106.

At block 410, mechanically-generated card values from detector 106 are received at gaming sever 108 through communication interface 204 and provided to processor 200. In another embodiment, processor 200 determines the mechanically-generated card values from information provided by detector 106, such as the case where detector 106 comprises a video or still camera.

At block 412, the mechanically-generated card values received, or determined, at block 410 are removed from consideration by processor 200 as it generates random electronic card values for initial player hands.

At block 414, processor 200 provides an indication of the dealer's "up" card to each player, plus two random electronic card values representing players' initial hands. Electronic generation of random card values is well known in the art using random number generation code, circuits, or a combination of the two, typically using a predetermined number of possible card values, e.g., 52 different card values, each one representing a card from a physical deck of playing cards, respectively. However, in one embodiment, processor 200 eliminates the card values received at block 410 from the initial number of possible card values prior to the random generation process. For example, if a total of three card values were received from detector 106 at block 410, the six of clubs, the ten of hearts, and the 3 of spades for example, these cards would be removed from the 52 card values normally available to processor 200 for random generation/selection for player cards. In another embodiment, all 52 card values are available to processor 200 for random selection. However, as each card is selected, it is compared to the mechanically-generated card values received at block 410 and if a match is found, the randomly-selected electronic value is discarded and the process is repeated until the selected value does not match any of the received mechanically-generated card values. In either case, processor 200 provides the initial random electronic card values to each player via communication network 116. Processor 200 may also calculate and store a hand value for each of the players in memory 202 after the players' hands have been distributed.

At block 416, processor 200 removes the random electronic card values provided to each player at block 414 from further consideration in generating future card values during remaining game play.

Blocks 418-424 describe player action for each player as it relates to processor 200.

At block 418, processor receives an indication from the first player whether the first player requests another card or not. If not, the player stands, and processing proceeds to block 426. If the player requests another card, processor 200 randomly generates/selects another card value for the player that has not already been dealt by the dealer or previously selected by processor 200, shown at block 420. The card value is then provided to the player via communication network 116 and the virtual gaming environment.

At block 422, the player's final score is calculated by processor 200 based on the total value of the card values that the player have been received. At block 424, the player's score is compared to a value of 21. If the score does not exceed a value of "21", processing reverts back to block 418, where processor 200 waits for another indication from the first player whether he or she would like another card or not. If the player's score exceeds 21, the player has "busted", and processing continues to block 424.

Blocks 418-424 are then repeated for each remaining player.

At block 426, after all of the players have been accommodated, processor 200 reveals the value of the dealer's "hole" card that was received at block 410 to each of the players so that each player can view the dealer's hand as it progresses. Each player's virtual gaming environment is updated as the hole card is revealed, as well as when additional contingency cards are revealed.

Under traditional rules of blackjack, the dealer must "stand" if the dealer's total card value equals 17-21, and must take another card if the total value of the dealer hand equals 3-16. If the total dealer card value is between 17 and 21, processing continues to block 428 where the player's hands are reconciled with the dealer's final result. If the dealer's total card value is between 3 and 16, processor 200 reveals one contingency card received by processor 200 at block 410, to the players. This continues as long as the dealer does not bust and if the dealer's total card value is between 3 and 16.

At block 428, the dealer's total, final card value is compared to each player's total final value to determine which players have won the round of play. Processor 200 provides an indication to each player, indicating whether the player has won, lost, or tied the dealer's hand. Processor provides credits to accounts of players who have beaten the dealer and assigns debits to player's accounts who have not beaten the dealer in an amount equal to the initial wager. In the case of a tie between the dealer and a player, typically neither a debit nor a credit is provided or assigned.

At block 430, processor 200 may generate an invitation for winning players to provide comments regarding the previous round of play. In another embodiment, processor 200 provides an indication of the one or more winners to the dealer at location 102 and the dealer provides a verbal invitation for the winning player(s) to provide comments over, for example, a television network. In either of the above embodiments, an indication could be provided, either by processor 200 and/or the dealer at location 102, of a general identity and/or location of a player who has received a rare game result, such as receiving a royal flush in a game of draw poker. Winners could respond to the invitation by sending audio/video signals or textual responses to gaming server 108, where they could be forwarded to other game players and/or the dealer. In this way, game players feel more connected to other players and/or the dealer, which may add to their enjoyment of playing blackjack online using gaming system 100.

A next round of play may be initiated, i.e., blocks 402 through 430 may be repeated, taking into account any new players that have joined the game and any players who have dropped out.

Figure 5:
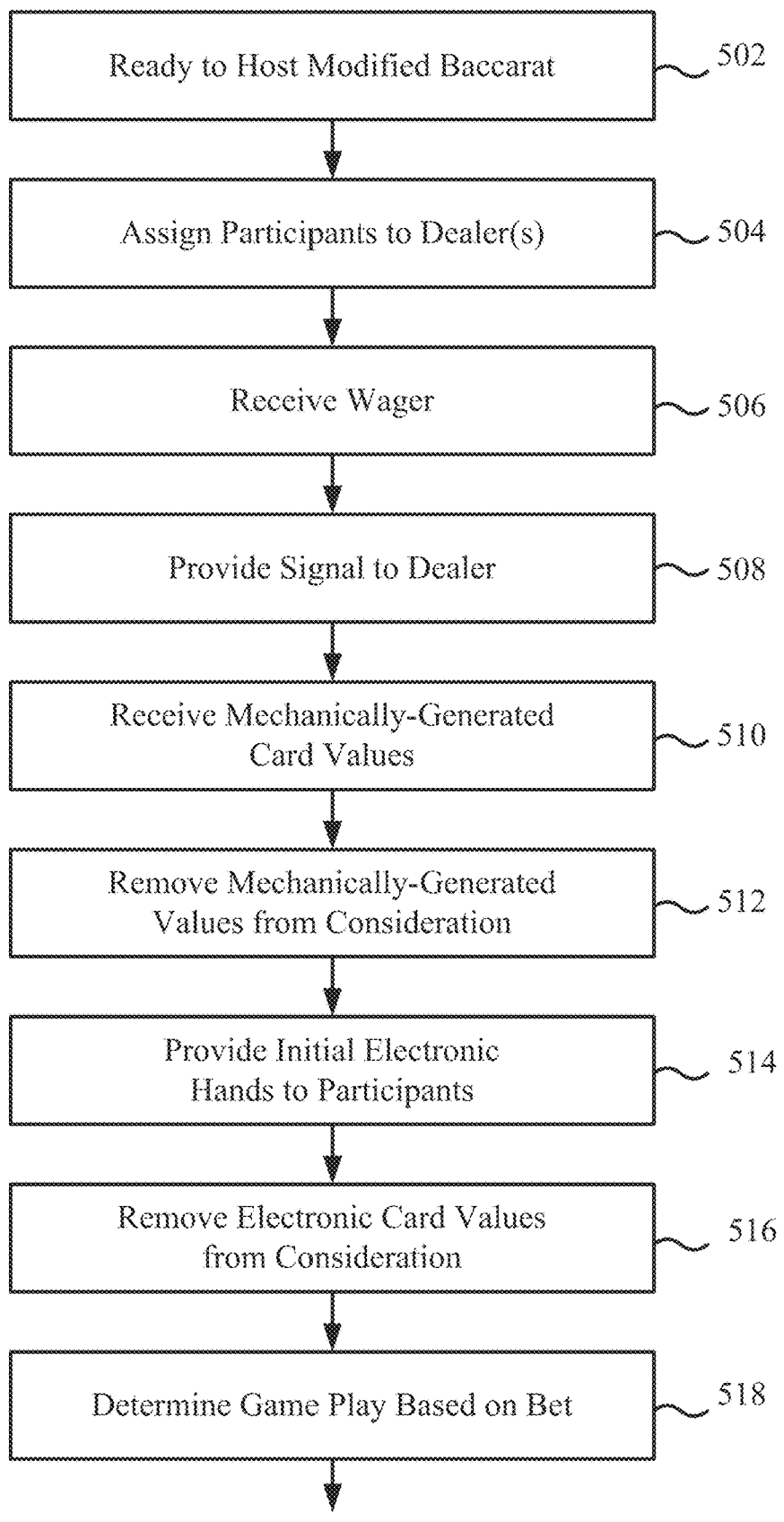
FIGS. 5A, 5B and 5C depict a flow diagram illustrating one embodiment of the method of FIG. 3, specifically illustrating a method of how the gaming server of FIG. 2 operates during a hybrid game of baccarat.
Figure 5A:
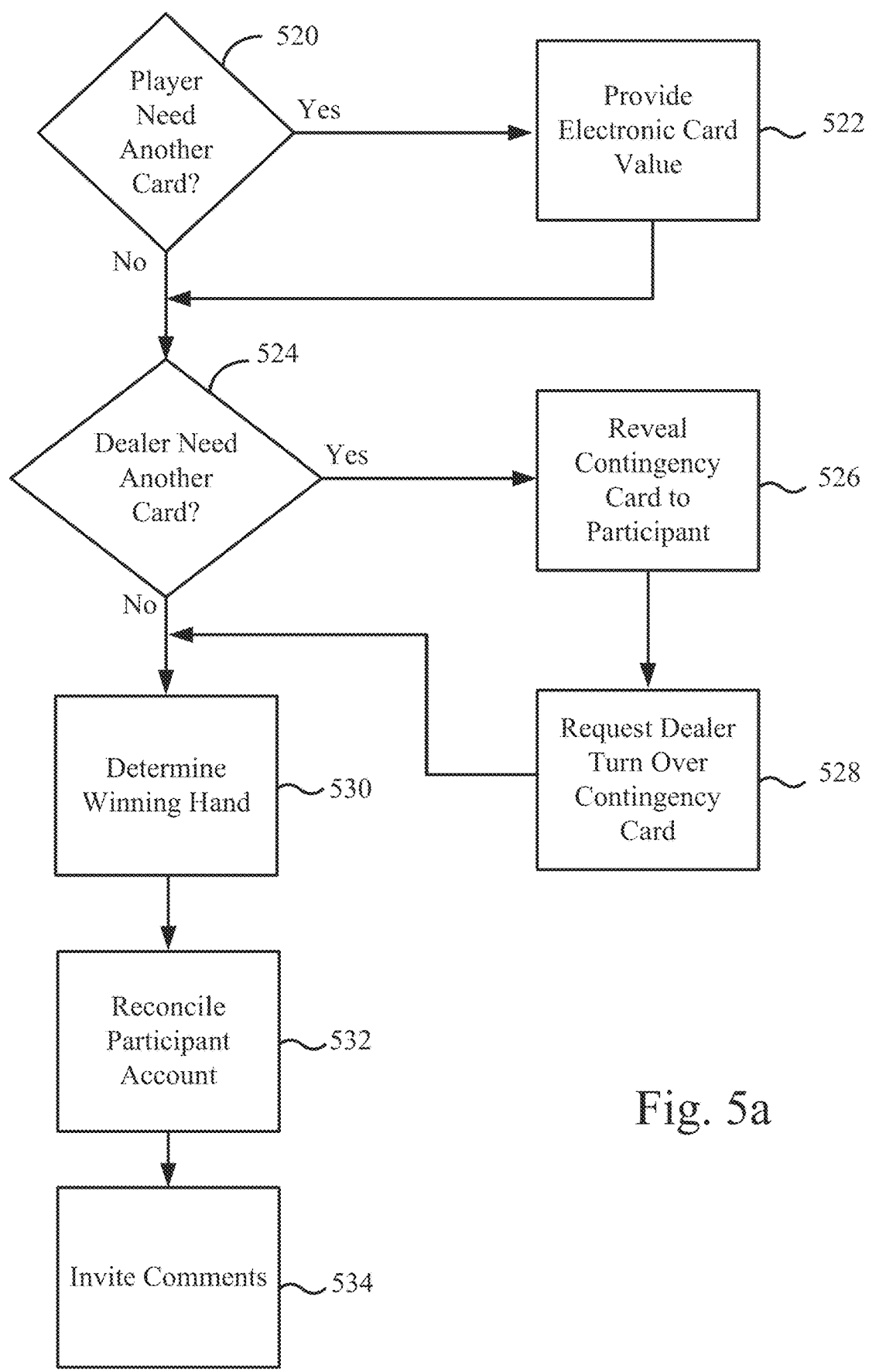
Figure 5B:
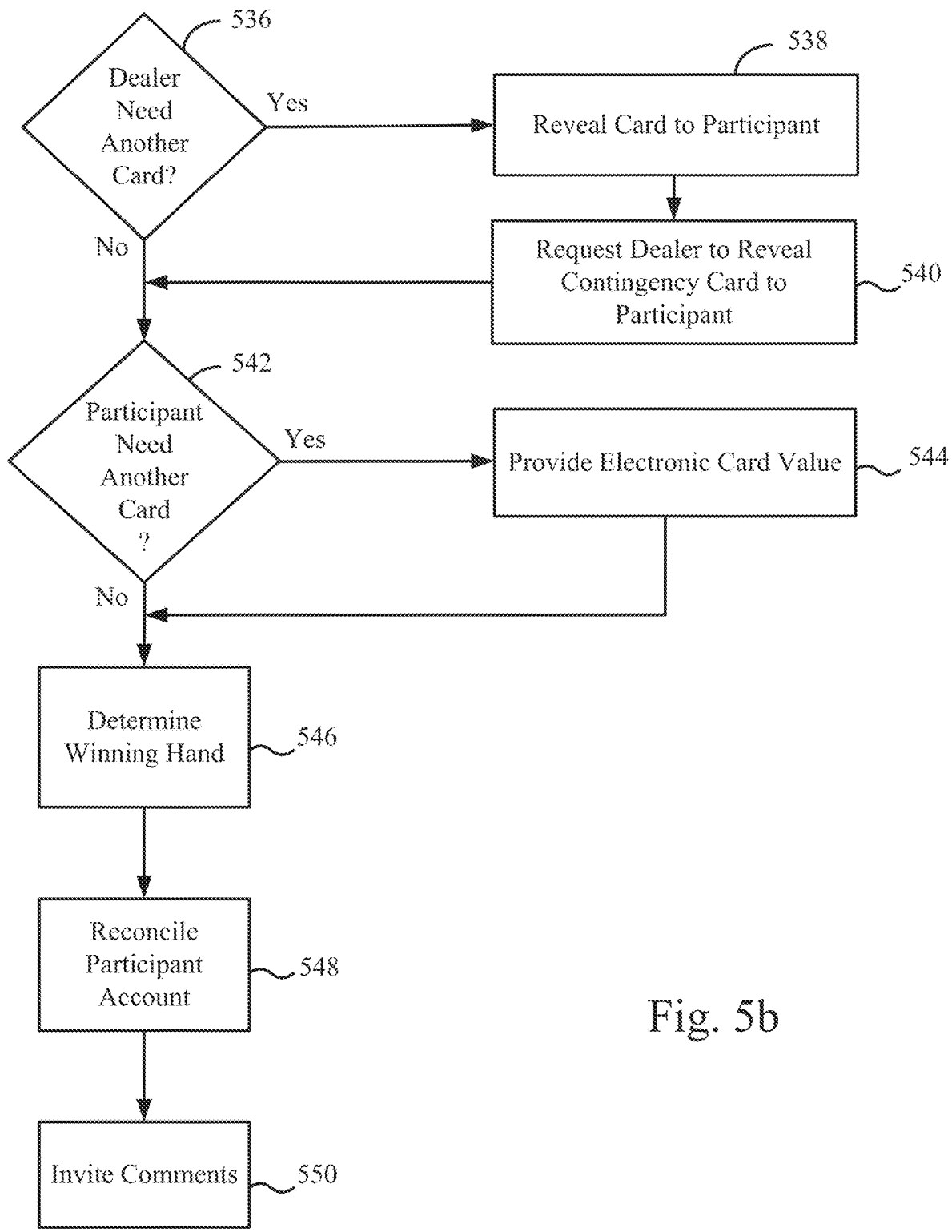

FIGS. 5A, 5B and 5C depict a flow diagram 500 illustrating the method of FIG. 3, specifically illustrating an embodiment of a modified game of baccarat being played remotely by one participant using hybrid gaming system 100. The modified game of baccarat allows game participants to receive a player hand and a bank hand in addition to the bank hand and player hand that the dealer receives. In one embodiment, participants may bet on one or more of the following events:

1. The dealer bank hand will beat the dealer player hand
2. The dealer player hand will beat the dealer bank hand
3. The dealer player hand ties the dealer bank hand
4. The participant's bank hand will beat the participant's player hand
5. The participant's player hand will beat the participant's bank hand
6. The participant's dealer player hand ties the participant's bank hand
7. The participant's bank hand will beat the dealer's player hand
8. The participant's player hand will beat the participant's bank hand
9. The participant's player hand ties the dealer's bank hand
10. The participant's bank hand ties the dealer's player hand The first 6 bets identified above are played straightforwardly. In bets 1 through 3, a participant merely bets on one of the three outcomes as provided by the dealer at location 102. In bets 4 through 6, the participant merely bets on one of the three outcomes from hands generated randomly by processor 200. In other words, in bets 1 through 6, hybrid gaming is not played; participants bet on either real dealer action or virtual player action, but there is not a combination of real dealer hands being played against virtual participant hands.

Thus, the method illustrated in FIGS. 5A, 5B and 5C describe method of how a modified, hybrid game of baccarat may be played with a single participant as an example. In this method, remote game participants receive processor-generated bank and player hands that are played against mechanically-generated bank and player hands dealt from a deck of cards by a dealer at location 102. It should be understood that the method described in FIGS. 5A, 5B and 5C could also be played using two or more participants, each participant receiving a virtual bank hand and a virtual player hand and playing either, or both, hands against opposing dealer and bank hands dealt be a dealer at location 102. Finally, it should be understood that the steps described in this method could be performed in an order other than what is shown and discussed.

The method of play begins at block 502, where gaming sever 108 provides an indication that it is ready to host one or more games of modified, hybrid baccarat, typically by providing such the indication to prospective game players via a respective electronic device operated by each prospective player. The indication may comprise a website listing a number of games currently available for prospective game players to join.

Players may use their electronic devices to sign into, or register with, gaming server 108 using a pre-established user ID and password. Players who do not have a user ID and password generally create an account with gaming server 108 by providing personal information, such as a name, address, and/or credit card information to gaming server 108.

At block 504, one remote game participant requests to play the game. In another embodiment, two or more participants may wish to join the game. In one embodiment, a large number of participants may play the game by assigning participants into groups, each group playing against mechanically-generated hands generated at location 102, one group being provided with electronic, random card values by processor 200 from a first number of potential card values and the second group being provided with electronic, random card values by processor 200 from a second number of potential cards values. A group may comprise a single game player. Participants may request to play against a particular dealer, one or more other remote game participants, and/or a preferred virtual table. In the present case, the one remote game participant is assigned to a particular virtual game table and/or dealer, using techniques already known in the art.

At block 506, the remote game participant places one or more wagers via the virtual gaming environment and communication network 116. For example, at least bets 7-10 may be placed, either by selecting a single bet or by selecting multiple bets. Of course, selecting multiple bets will result in some bets cancelling others out.

In block 508, in one embodiment, gaming sever 108 generates and provides a request to location 102, via dealer interface 118 for example, to begin dealing physical playing cards in accordance with a modified game of baccarat. The request may comprise an electronic, visual, audible, or other signal provided either directly to mechanical device 104 or to a real, live individual in charge of operating mechanical device 104, such as a dealer dealing physical playing cards. In the latter case, the request from gaming server 108 may be directed to a visual monitor, display, computer, smartphone, indicator light, LED, etc.

In response to receiving the request to begin dealing at block 508, six cards are dealt from an mechanically-generated deck of playing cards at location 102, two cards representing an initial dealer player hand, two cards representing an initial dealer bank hand, and two contingency cards, one relating to the dealer bank hand and one relating to the dealer player hand. The initial hands are typically dealt face up while the contingency cards may be dealt face down. As they are dealt, their values are detected by detector 106.

The contingency cards are dealt in advance of processor 200 generating card values for any players, so that processor 200 will know in advance which cards have been played, and thus not available for distribution to players. In the present case, the dealer player hand and the dealer bank hand may each potentially receive one additional card each during game play. Therefore, each of those hands receives one contingency card each.

At block 510, the value of the cards dealt at location 102 are received at gaming sever 108 through communication interface 204 and provided to processor 200, including the values of the contingency cards.

At block 512, the six card values received at block 510 are removed from further consideration by processor 200 during random card value generation to players. In the present example, six values are removed from the initial potential pool of 52 potential candidate card values, leaving only 46 card values for processor 200 to choose from.

At block 514, processor 200 generates initial electronic, random card values for the remote participant, excluding card values received from detector 106 at block 306. The process of generating random card values is well-known in the art. In order to exclude card values received at block 306, processor 200 either eliminates them from consideration prior to the random generation process, or they are included in the random generation process, discarded if they match any of the card values from block 306, and another value randomly selected. In any case, processor 200 provides the initial random card values to the remote participant via communication network 116 and virtual gaming environment displayed on the participant's electronic device.

At block 516, processor 200 removes the random electronic card values provided to the remote participant from further consideration in generating future card values during remaining game play.

At block 518, processor 200 uses the bet that the participant has placed to determine game play. For example, if the remote participant has bet on the participant's final player hand beating the dealer's final bank hand or if the participant has bet on the participant's final player hand tying the dealer's final bank hand, processing continues to the method shown in FIG. 5B. If the remote participant has bet on the participant's final bank hand beating the dealer's final player hand or if the participant has bet on the participant's final bank hand tying the dealer's final player hand, processing continues to the method shown in FIG. 5C.

The process shown in FIG. 5B begins with processor 200 determining whether the remote participant's initial player hand should receive one additional card, depending on the total value of the participant's initial player hand, the total value of the dealer's initial bank hand, in accordance with the rules of baccarat at block 520. If so, processor 200 generates another electronic, random card value at block 522, and provides the card value to the remote participant via communication interface 116 and the virtual gaming environment.

If the remote participant does not require another card value at block 520, or after the remote participant receives another card value at block 522, processor determines whether the dealer's initial bank hand should receive one additional card, based on the total value of the participant's final player hand (e.g., the value of the remote participant's player hand after blocks 520 and 522), the total value of the dealer's initial bank hand, in accordance with the rules of baccarat at block 524. If so, processor 200 reveals the dealer's bank hand contingency card that was provided to processor 200 at block 510 to the remote participant at block 526. Optionally, processor 200 may provide a request to the dealer at location 102 to turn over the dealer's bank hand contingency card so that a visual image may be provided to the participant via gaming server 108 at block 528.

At block 530, the dealer's final bank hand is compared to the participant's player final hand to determine which hand has won, or if a tie has occurred between the hands, in accordance with the rules of baccarat. Processor 200 provides an indication to the participant indicating whether the participant's final player hand has beaten the dealer's final bank hand or not, or whether a tie occurred between the hands. At block 532, the participant's account is reconciled by processor 200 providing a credit to the participant's account if the participant wagered, at block 506, that the participant's final player hand would beat the dealer's final bank hand and, in fact, the participant's final player hand has beaten the dealer's final bank hand, or if the participant wagered, at block 506, that the participant's final player hand would tie the dealer's final bank hand and, in fact, the participant's final player hand has tie the dealer's final bank hand. Otherwise, processor 200 debits the participant's account in the amount of the wager.

At block 534, processor 200 may generate an invitation for the participant to provide comments regarding the previous round of play. In another embodiment, processor 200 provides an indication of the winning participant to the dealer at location 102 and the dealer provides a verbal invitation for the winning player(s) to provide comments over, for example, a television network. In either of the above embodiments, an indication could be provided, either by processor 200 and/or the dealer at location 102, of a general identity and/or location of a participant who has received a rare game result, such as winning 10 rounds of play in a row. The participant could respond to the invitation by sending audio/video signals or textual responses to gaming server 108, where they could be forwarded to other game participants and/or the dealer. In this way, game participants feel more connected to other participants and/or the dealer, which may add to their enjoyment of playing baccarat online using gaming system 100.

Referring back to block 518, if the remote participant has bet on the participant's final bank hand beating the dealer's final player hand or if the participant has bet on the participant's final bank hand tying the dealer's final player hand, processing continues to the method shown in FIG. 5C.

The process shown in FIG. 5C begins with processor 200 determining whether the dealer's initial player hand should receive one additional card, depending on the total value of the dealer's initial player hand, the total value of the participant's initial bank hand, in accordance with the rules of baccarat at block 536. If so, processor 200 reveals the dealer's player hand contingency card that was provided to processor 200 at block 510 to the participant at block 538. Optionally, processor 200 may provide a request to the dealer at location 102 to turn over the dealer's player hand contingency card so that a visual image may be provided to the participant via gaming server 108 at block 540. In one embodiment, the contingency card value is only revealed to participants who require it to complete game play. In another embodiment, the contingency card value is provided to other participants as well, without relevance to those participants.

If the dealer does not require another card at block 536, or after the dealer receives another card (e.g., processor 200 revealing the player hand contingency card to the participant) at block 538, processor determines whether the player's initial bank hand should receive one additional card, based on the total value of the dealer's final player hand, the total value of the player's initial bank hand, in accordance with the rules of baccarat at block 542. If so, processor 200 generates another electronic, random card value, at block 544 and provides the card value to the remote participant via communication interface 116 and the virtual gaming environment.

At block 546, the dealer's final player hand is compared to the participant's bank hand to determine which hand has won, or if a tie has occurred, in accordance with the rules of baccarat. Processor 200 provides an indication to the participant indicating whether the participant's final bank hand has beaten the dealer's final player hand or not, or whether a tie occurred between the hands. At block 548, the participant's account is reconciled by processor 200 providing a credit to the participant's account if the participant wagered, at block 506, that the participant's final bank hand would beat the dealer's final player hand and, in fact, the participant's final bank hand has beaten the dealer's final player hand, or if the participant wagered, at block 506, that the participant's final bank hand would tie the dealer's final player hand and, in fact, a tie has occurred. Otherwise, processor 200 debits the participant's account in the amount of the wager at block 506.

At block 550, processor 200 may generate an invitation for the participant to provide comments regarding the previous round of play. In another embodiment, processor 200 provides an indication of the winning participant to the dealer at location 102 and the dealer provides a verbal invitation for the winning player(s) to provide comments over, for example, a television network. In either of the above embodiments, an indication could be provided, either by processor 200 and/or the dealer at location 102, of a general identity and/or location of a participant who has received a rare game result, such as winning 10 rounds of play in a row. The participant could respond to the invitation by sending audio/video signals or textual responses to gaming server 108, where they could be forwarded to other game participants and/or the dealer. In this way, game participants feel more connected to other participants and/or the dealer, which may add to their enjoyment of playing baccarat online using gaming system 100.

After block 550, the next round of play may be initiated, i.e., blocks 502 through 550 may be repeated, taking into account any new participants that have joined the game and any participants who have dropped out.

Figure 6:
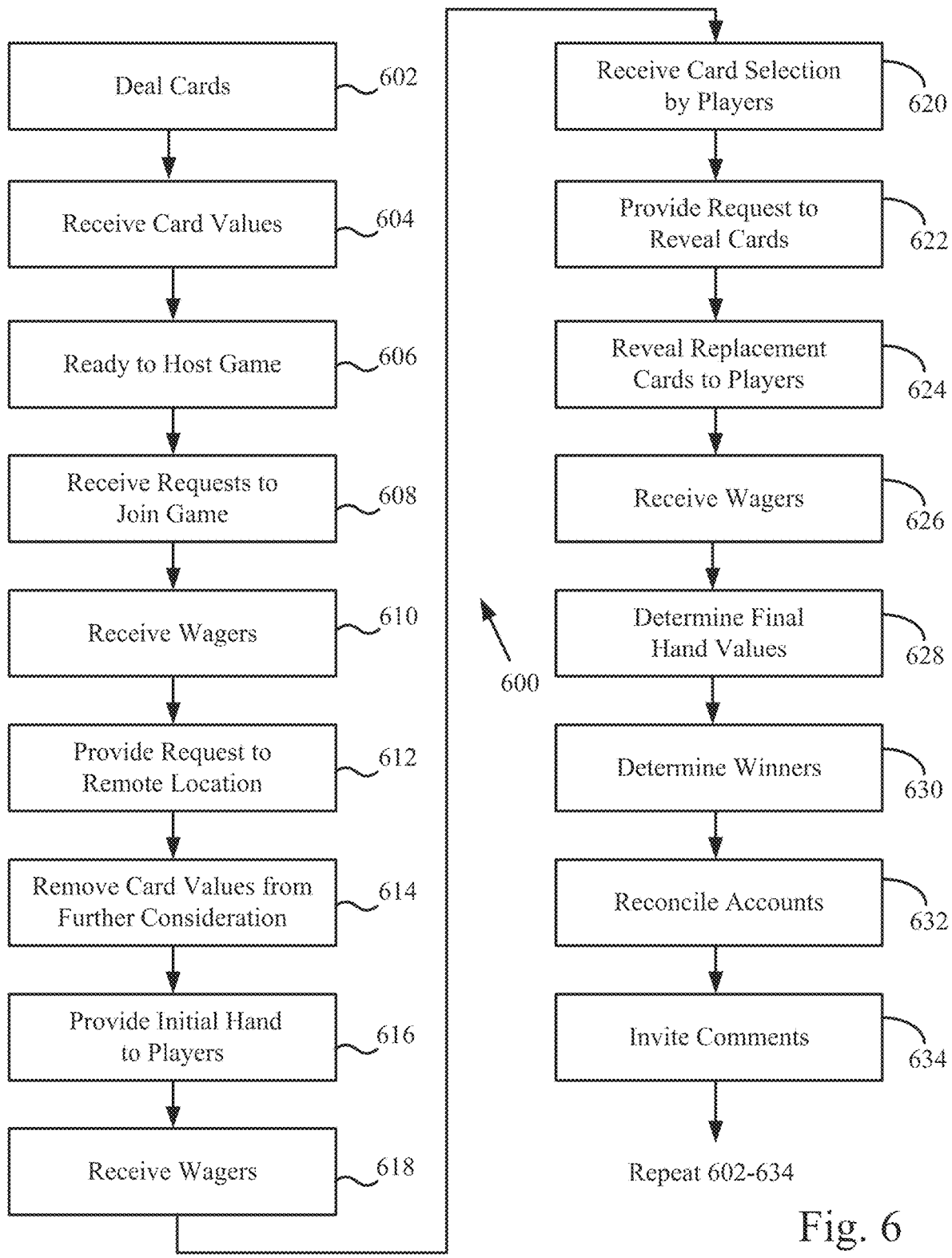
FIG. 6 is a flow diagram illustrating one embodiment of the method of FIG. 3, specifically illustrating a method of how the gaming server of FIG. 2 operates during a game of "jacks-or-better" draw poker.

FIG. 6 is a flow diagram 600 illustrating the method of FIG. 3, specifically illustrating an embodiment how a game of "jacks-or-better" draw poker may be played. In this particular type of poker, players place a wager before game play, hoping to have a final poker hand of a pair of jacks, or better. The better the player's final hand, the more he or she wins. One of the advantages of this embodiment is that an unlimited number of players can participate in each game, as explained below. It should be understood that the steps described in this method could be performed in an order other than what is shown and discussed. For example, in this embodiment, the process begins as a live dealer deals cards, then players join the game, and then the cards are provided to the players by gaming server 106. In another embodiment, gaming server 106 may register players for game play, then send a request for the dealer to deal an initial card hand.

At block 602, five cards are dealt from a deck of physical playing cards at location 102, representing an initial hand for players when the game begins. The cards may be dealt face up or face down. In either case, the card values are provided to gaming server 108 via detector 106 and communication network 116, indicating that mechanically-generated game values are available for use by gaming server 108 at block 604. Typically, the cards are dealt face down so the card values are not disclosed to a camera at location 102.

Figure 7:
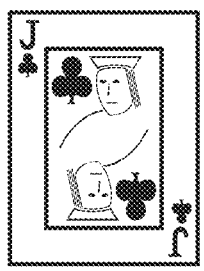
FIG. 7 is an illustration of an initial and contingent hand of draw poker dealt by a real dealer as an example relating to the method of FIG. 6.
Figure 7:
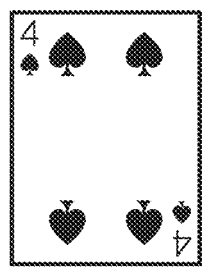
Figure 7:
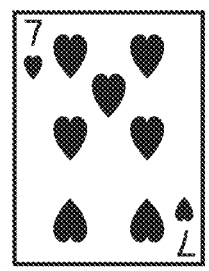
Figure 7:
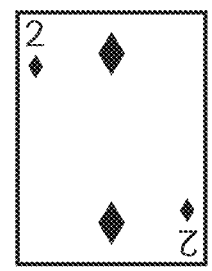
Figure 7:
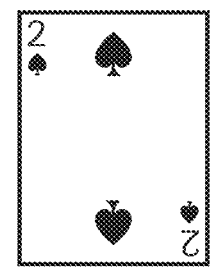
Figure 7:
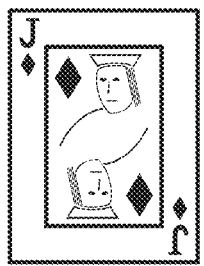
Figure 7:
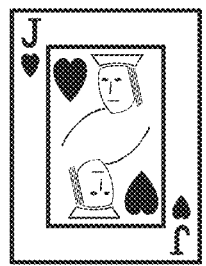
Figure 7:
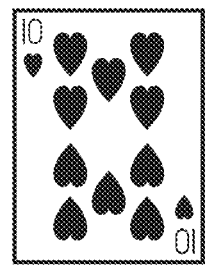
Figure 7:
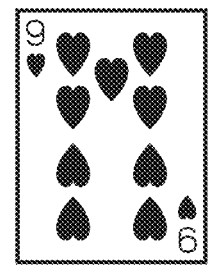
Figure 7:
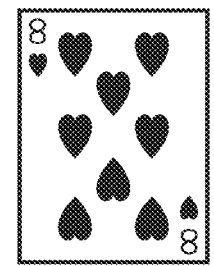

In addition to the five initial cards, 5 more "contingent" cards are dealt, typically face down. The values of these cards are also detected by detector 106 and provided to gaming server 108. A representation of the five initial cards 700 and the five contingent cards 702 is shown in FIG. 7. The cards shown in FIG. 7 will be used for the remainder of the discussion with respect to method 600. As shown, initial cards 700 comprise the jack of diamonds, the jack of hearts, the ten of hearts, the nine of hearts, and the eight of hearts. Contingent cards 702 comprise the jack of clubs, the four of spades, the seven of hearts, the two of diamonds, and the 2 of spades.

At block 606, gaming sever 108 provides an indication that it is ready to host a game of jacks-or-better draw poker, typically by providing a web page having a way for remote game players to sign into the game, register, or otherwise indicate that they would like to participate in game play.

At block 608, one or more players sign up, register, or otherwise provide an indication to gaming server 108 that they would like to participate in the game. In one embodiment, game play begins when a predetermined number of players sign in. In another embodiment, play beings after a predetermined time period has expired after gaming server 108 provides the indication at block 606. Players may request to play against a particular dealer and/or one or more other remote game participants.

In one embodiment, as players provide requests to play the game, processor 200 may assign the players into groups. For example, before game play, processor 200 may define a first group of players as a first number of players who submit a request to play a game and a second group of players comprising a second number of players requesting game play. A group may comprise a single game player. Each of the players in both groups play the same game of jacks-or-better poker using initial and contingent card values generated at location 102. However, in one embodiment, one group of players receives electronic, random game values provided from a first set of possible game values by processor 200, and the second group of players receives electronic, random game values provided to the second group from a second set of possible game values. For example, the first group of players may receive electronic, random card values from a first "electronic deck" of cards, e.g., 52 card values relating to an mechanically-generated deck of cards, less any mechanically-generated card values received from location 102 or previously provided to players in the first group. The second group of players may receive electronic, random card values from a second "electronic deck" of cards, e.g., 52 card values relating to an mechanically-generated deck of cards, less any mechanically-generated card values received from location 102 or previously provided to players in the second group.

In any case, at block 610, each player wishing to participate in the current game places a wager via communication network 116 using an electronic device operated by each player.

At block 612, processor 200 may provide a request to location 102, alerting the dealer and/or mechanical device 106 that game play has commenced, and to reveal the five initial cards 700 to a camera so that video images may be provided to players, either through communication network 116 or a second communication network, such as a television network. The request may be presented to a dealer at location 102 via dealer interface 118.

At block 614, processor 200 excludes the initial and contingent card values received at block 604 from further consideration by processor 200 before or during random, electronic card value selection/generation to players, as explained elsewhere herein.

In block 616, processor 200 provides a visual and/or audible representation of the initial cards dealt at location 106 to each of the players via communication network 116 and the virtual gaming environment presented to each player via their respective electronic devices.

At block 618, another bet may be accepted by processor 200 from any of the players.

At block 620, processor 200 receives an indication from the players identifying card values to keep and/or card values to discard in anticipation of drawing additional cards, from the initial five cards provided at block 616. For example, a first player may choose to keep the two jacks of initial cards 700 shown in FIG. 7 in hopes of drawing an additional jack or two jacks, another pair, or another three of a kind. A second player may choose to retain all of the cards of initial cards 700 except the jack of diamonds in hopes of drawing a flush, a straight, or a straight flush.

At block 622, processor 200 may provide a request to location 102 to reveal the five contingent cards 702 so that a camera may provide video and/or audio signals of the cards to players, either through communication network 116 or a second communication network, such as a television network. The request may be presented to a dealer at location 102 via dealer interface 118.

At block 624, processor 200 reveals a number of contingent cards to each player, the number of contingent cards based on the number of cards each player has chosen to keep (and/or discard). In the present example, the first player has kept two cards, therefore contingent cards 708, 710, and 712 are revealed to the first player by providing an update to the first player's virtual gaming environment. The second player has kept four cards, therefore contingent card 704 is revealed to the second player by providing an update to the second player's virtual gaming environment. Although the contingent cards provided to the players were selected based on the physical location of the cards that were discarded, processor 200 may select any of the contingent cards to players. For example, rather than providing contingent cards 708, 710, and 712 to the first player, contingent cards 704, 706 and 712 could have been provided instead. In one embodiment, processor 200 selects which contingent cards are provided as replacement cards to players using a random selection of the contingent cards.

At block 626, a final bet may be accepted by processor 200 from any of the players.

Figure 8:
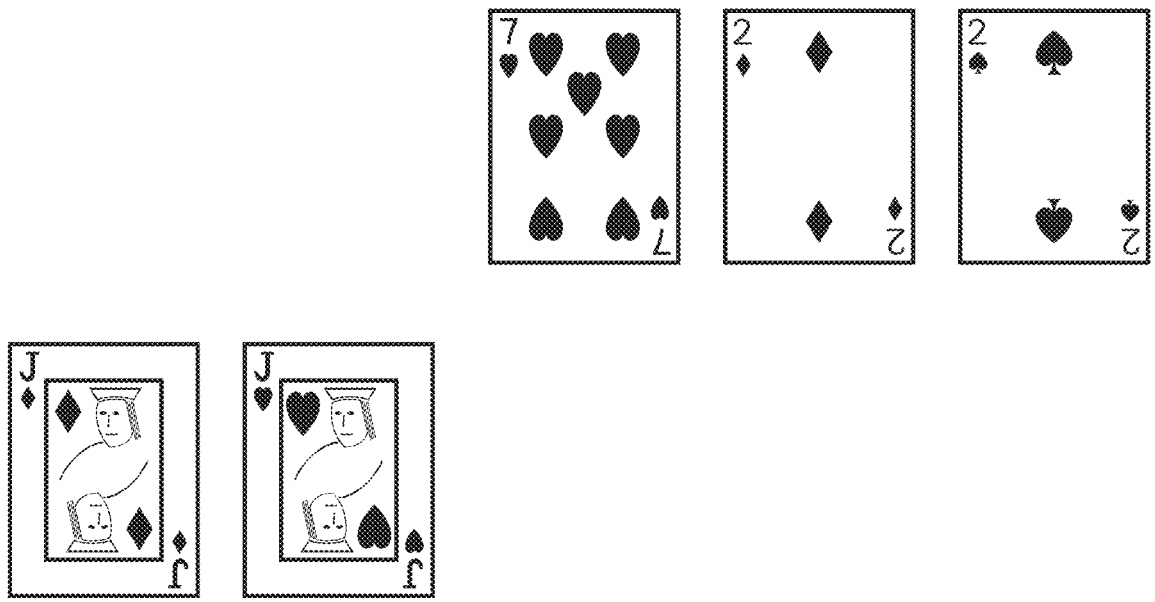
FIG. 8 is an illustration of a first final poker hand obtained by combining the initial and contingent hands of FIG. 7.
Figure 9:
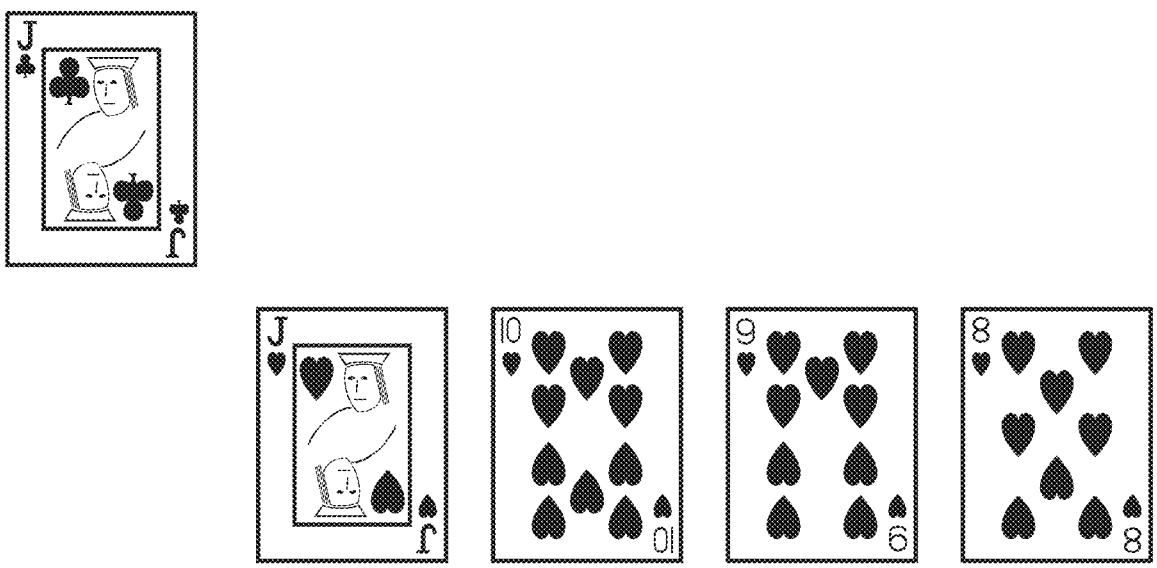
FIG. 9 is an illustration of a second final poker obtained by combining the initial and contingent hand of FIG. 7.

At block 628, processor 200 determines the value of each player's final hands. The first player would see his two retained cards supplemented with three replacement cards, the 7 of hearts, the 2 of diamonds, and the 2 of spades, as shown in FIG. 8. Thus, the first player's final hand comprises two pair (jacks and twos), with a 7 kicker. The second player would receive only one replacement card, because the second player chose to hold 4 out of the original 5 cards. The second player's final results thus comprises the jack of clubs, which is added to the four cards that were originally held (the jack of hearts, the 10 of hearts, the nine of hearts, and the 8 of hearts), as shown in FIG. 9. The second player's final hand, thus, comprises a pair of jacks (the jack of clubs and the jack of hearts). Thus, each player's final hand comprises a number of initial cards that were held plus a number of replacement cards provided at block 624.

At block 630, processor 200 evaluates each of the player's final hands to determine whether each player's hand has exceeded a predetermined threshold, such as a pair of jacks. If so, processor 200 reconciles accounts associated with player's having a winning hand in accordance with predetermined pay-out information stored within memory 202, at block 632. In the present example, both players would receive a payout because they both have final poker hand better than a pair of jacks.

At block 634, processor 200 and/or the dealer at location 102, may invite the winner(s) of the previous round of play to provide information over communication network 116, the information comprising a still image, video information, or audio information pertaining to the winner. In another embodiment, processor 200 and/or the dealer may invite any player having a final hand equal to or exceeding a rare hand to provide information, for example, if any player's hand comprises four of a kind or a straight flush. The winner(s) could use a web-camera to send a real video and audio signal that is provided to the other game players. For instance, the winner(s) may playfully taunt the other players or provide a comment as to the previous round of play, or any other comments the winner(s) might have. In this way, the game players feel more like they are participating in a real poker game, which may add to their enjoyment of playing games of chance using system 100.

After block 634, the next round of play may be initiated, i.e., blocks 602 through 634 may be repeated, taking into account any new players that have joined the game and any players who have dropped out.

Figure 10:
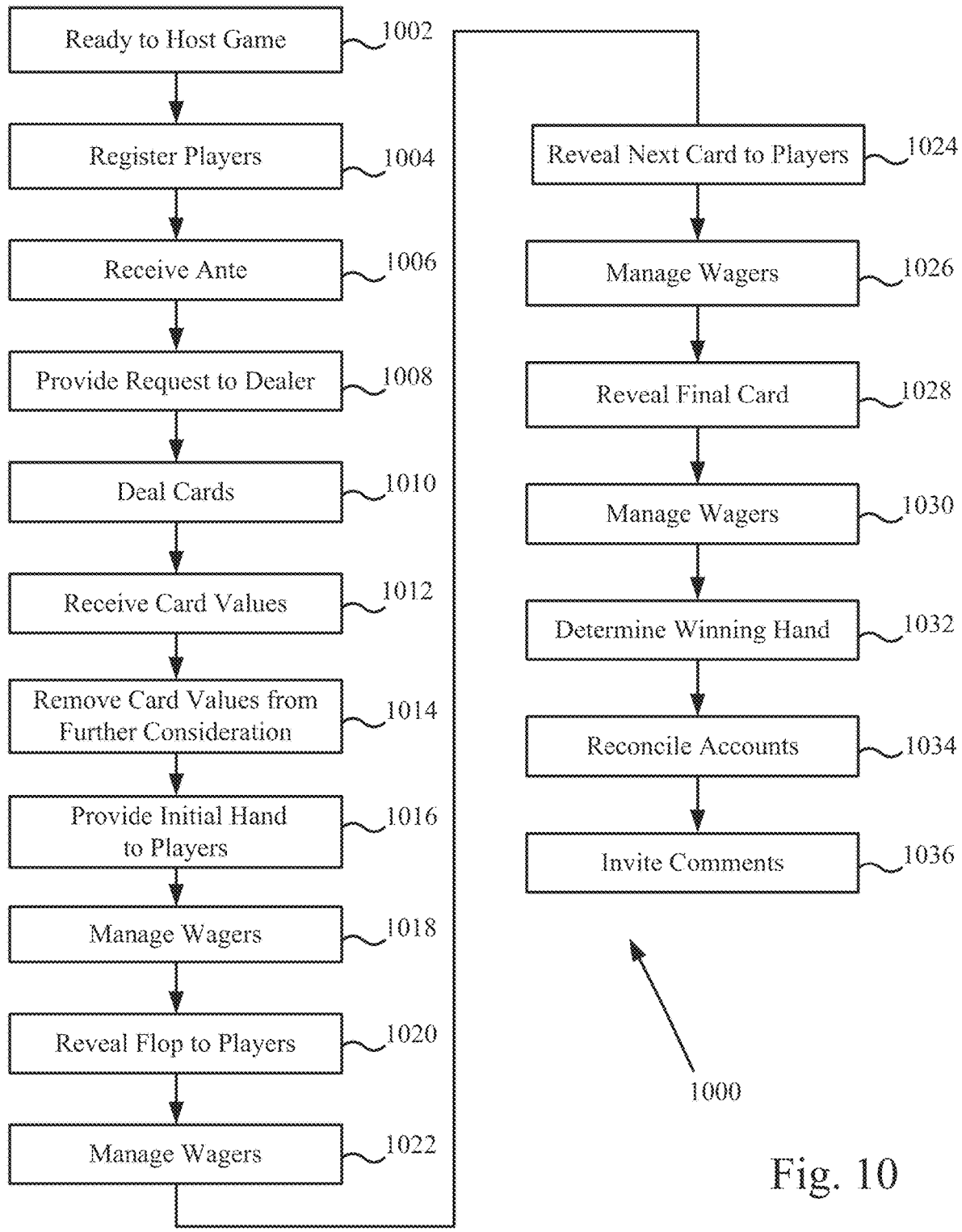
FIG. 10 is a flow diagram illustrating one embodiment of the method of FIG. 3, specifically illustrating a method of how the gaming server of FIG. 2 operates during a hybrid game of Texas Hold 'Em.

FIG. 10 is a flow diagram 600 illustrating the method of FIG. 3, specifically illustrating an embodiment how a game of hybrid "Texas Hold 'Em" may be played using system 100. In this particular type of poker, players play against each other to form their best five-card poker hand based on two individual cards plus five "community" cards that are used by all of the players to construct their hands as well. It should be understood that the steps described in this method could be performed in an order other than what is shown and discussed.

At block 1002, gaming sever 108 provides an indication that it is ready to host a game of Texas Hold 'Em, typically by providing a web page having a way for remote game players to register or sign into the game over communication network 116. In one embodiment, game play begins when a predetermined number of players sign in. In another embodiment, play beings after a predetermined time period has expired.

At block 1004, one or more players sign up, register, or otherwise provide an indication to gaming server 108 that they would like to participate in the game. In one embodiment, game play begins when a predetermined number of players sign in. In another embodiment, play beings after a predetermined time period has expired after gaming server 108 provides the indication at block 1002. Players may request to play with a particular dealer and/or one or more other remote game players. In one embodiment, players are assigned to a virtual game table as processor 200 receives the player requests at block 1004.

In another embodiment, as players provide requests to play the game, processor 200 may assign the players into groups. For example, before game play, processor 200 may define a first group of players as a first number of players who submit a request to play a game and a second group of players comprising a second number of players requesting game play. A group may comprise a single game player. The players in each group play against other players in the same group. Each of the players in both groups play the same game of Texas Hold 'Em using community card values generated at location 102. However, in one embodiment, one group of players receives electronic, random game values provided from a first set of possible game values by processor 200, and the second group of players receives electronic, random game values provided to the second group from a second set of possible game values. For example, the first group of players may receive electronic, random card values from a first "electronic deck" of cards, e.g., 52 card values relating to an mechanically-generated deck of cards, less any mechanically-generated card values received from location 102 or previously provided to players in the first group. The second group of players may receive electronic, random card values from a second "electronic deck" of cards, e.g., 52 card values relating to an mechanically-generated deck of cards, less any mechanically-generated card values received from location 102 or previously provided to players in the second group.

In any case, at block 1006, one or more "antes" are received from one or two players. In Texas Hold 'Em, one ante is referred to as the "Big Blind" while the other ante is referred to as the "Small Blind". The antes provide an initial wager by the one or two players that are forfeited if they fold their hands during an initial round of play. The ante(s) are received by processor 200 over communication network 116 and, generally, an account associated with any player who submitted an ante is debited by the amount of the ante.

In block 1008, play beings by gaming sever 108 generating and providing a request to location 102 to begin dealing physical playing cards. In another embodiment, alternative or in addition to the request provided by processor 200, cards are dealt at location 102 prior to gaming server 108 providing the request at block 1002. The request may be presented to a dealer at location 102 via dealer interface 118.

In block 1010, five cards are dealt from a deck of physical playing cards at location 102, representing the five community cards that are used by the game players. One or more of these cards may be referred to as "contingent" cards, because they may or may not be used, depending on various actions taken by the players. For example, if no players decide to partake in the particular round of play, none of the five cards are revealed to the players. The cards may be dealt face up or face down. In either case, the card values are detected by detector 106 and provided to gaming server 108. Typically, the cards are dealt face down initially. In one embodiment, the dealer also deals two or more "burn" cards as the five cards are dealt. Thus a total of 7 or more cards may be removed from the deck of physical playing cards. The value of the burn cards may also be provided to gaming server 108 in the same manner as the five community card values, so that they may also be removed from consideration when generating electronic cards for the players.

At block 1012, processor 200 receives the five card values (plus optional burn card values) dealt by the dealer at block 1010 via detector 106 and communication network 116.

At block 1014, processor 200 excludes the five card values (and optional burn card values) received at block 1012 from further consideration by processor 200 before or during random, electronic card value selection/generation to players, as described earlier herein.

At block 1016, processor 200 provides initial hands to each of the players. Each initial hand comprises two, randomly-generated electronic card values, excluding the five card values received at block 1012 and optional burn card values. In an embodiment where two or more groups of players have been defined, each group receives electronic, random card values from a respective potential number of card values, each one having the community card values removed from consideration. As each card value is generated/selected by processor 200, it is removed from further consideration during game play so that game values are not duplicated.

At block 1018, processor 200 manages a round of wagering. Each player evaluates the two cards that have been randomly generated and provided to them by processor 200 at block 1016, and then either "calls" the ante back at block 106, raises the ante, or folds. In an embodiment where multiple groups have been defined, wagering is managed for each group. Processor 200 provides audio and/or visual cues to the players to inform them of how other players have wagered (e.g., call, raise, or fold), cues to players when it is their turn to act (e.g., call, raise, or fold), and adjust account balances associated with the players during the round of wagering. Such techniques are well-known in the art.

At block 1020, processor 200 reveals three of the five cards that were provided to processor 200 at block 1012, by updating to the virtual gaming environment for each player. Such an update typically comprises providing a graphical representation of the three cards lying in a row on a virtual table. These three cards are known as "the flop". Optionally, processor 200 may provide a request to location 102 to reveal three of the five cards to a camera so that a visual image of the cards may be provided to the players via gaming server 108.

At block 1022, processor 200 manages another round of betting among the players. Each player evaluates his or her hand based on the initial two cards provided to each player at block 1016 plus the three cards revealed to all of the players at block 1020. After the round of betting is complete, processing continues to block 1024.

At block 1024, processor 200 reveals another card value from the five cards dealt at block 1010. This card is commonly referred to as "the turn". This card value is provided to the players by providing an update to the virtual gaming environment for each player. Such an update typically comprises a graphical representation of a fourth of five cards lying in a row on the virtual table. Optionally, processor 200 may provide a request to location 102 to reveal the fourth card out of the five cards to a camera so that a visual image of the fourth card may be provided to the players via gaming server 108.

At block 1026, processor 200 manages another round of betting among the players. Each player evaluates his or her hand based on the initial two cards provided to each player at block 1016 plus the four cards revealed to all of the players at blocks 1020 and 1024. After the round of betting is complete, processing continues to block 1028.

At block 1028, processor 200 reveals the fifth and final card value from the five cards dealt at block 1010. This card is commonly referred to as "the River". This card value is provided to the players by providing an update to the virtual gaming environment for each player. Such an update typically comprises revealing a fifth of five cards lying in a row on the virtual table. Optionally, processor 200 may provide a request to location 102 to reveal the fifth card out of the five cards to a camera so that a visual image of the fifth card may be provided to the players via gaming server 108.

At block 1030, processor 200 manages a final round of betting among the players. Each player evaluates his or her hand based on the initial two cards provided to each player at block 1016 plus the five cards revealed to all of the players at blocks 1020, 1024, and 1028. After the round of betting is complete, processing continues to block 1032.

At block 628, processor 200 evaluates each of the player's hands to determine which hand is the best poker hand among the players based on the five community cards dealt by the dealer plus each player's individual, two-card hands. If multiple groups of players have been defined, a winner is determined for each group.

At block 1034, processor 200 credits a player account associated with the winning hand at block 628 with an amount equal to a "pot" consisting of all of the wagering that has occurred at blocks 1018, 1022, 1026, and 1030.

At block 1036, processor 200 may invite the winner(s) of the previous round of play to provide information over communication network 116, the information comprising a still image, video information, or audio information pertaining to the winner. In another embodiment, processor 200 may invite any player having a final hand equal to or exceeding a rare hand to provide information, for example, if any player's hand comprises four of a kind or a straight flush. The winner(s) could use a web-camera to send a real video and audio signal that is provided to the other game players. For instance, the winner(s) may playfully taunt the other players or provide a comment as to the previous round of play, or any other comments the winner(s) might have. In this way, the game players feel more like they are participating in a real poker game, which may add to their enjoyment of playing Texas Hold 'Em using system 100.

After block 1036, the next round of play may be initiated, i.e., blocks 1002 through 1036 may be repeated, taking into account any new players that have joined the game and any players who have dropped out.

Figure 11:
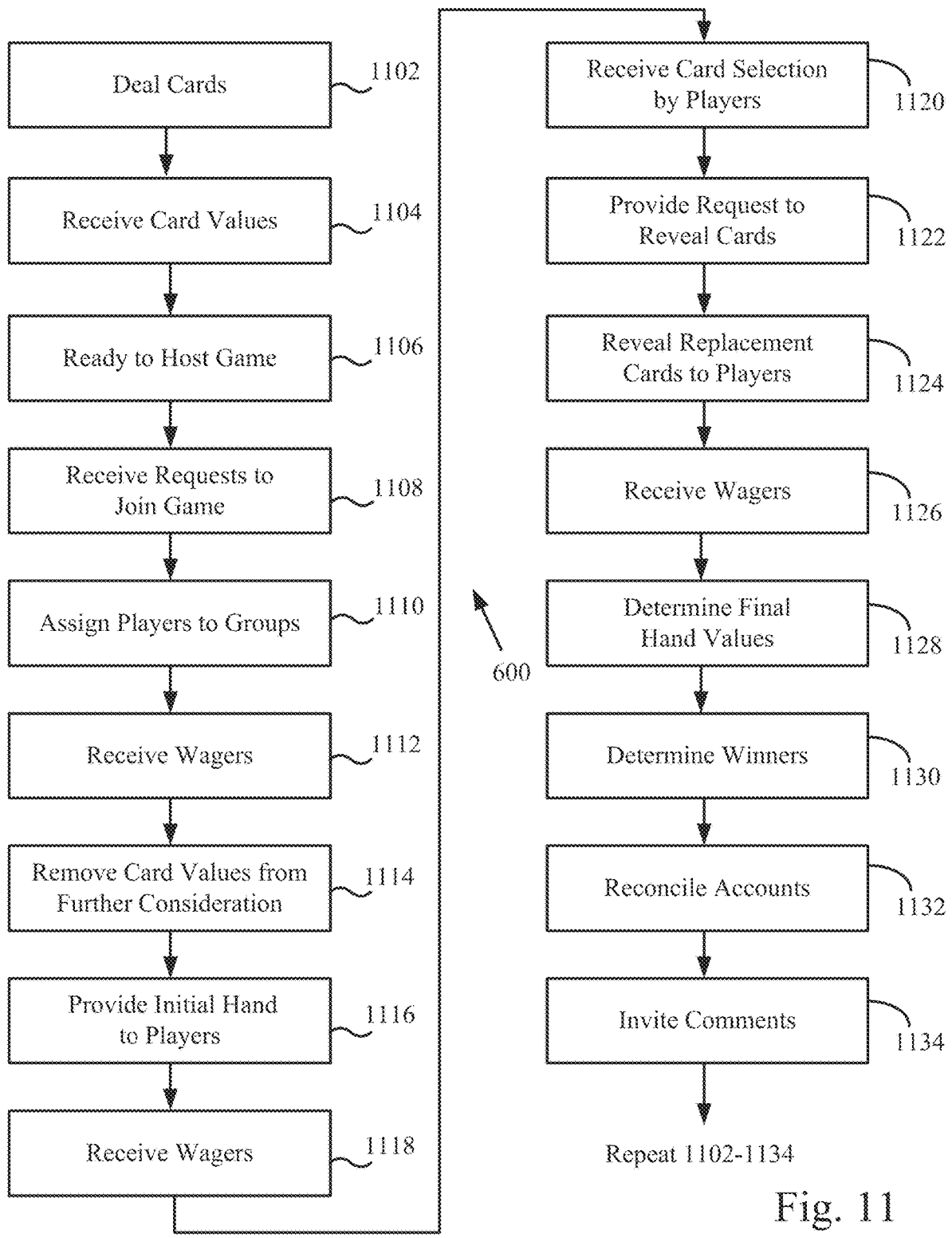
FIG. 11 is a flow diagram illustrating one embodiment of the method of FIG. 3, specifically illustrating a method of how the gaming server of FIG. 2 operates during a game of hybrid "jacks-or-better" draw poker.

FIG. 11 is a flow diagram illustrating one embodiment of the method of FIG. 3, specifically illustrating a method of how the gaming server of FIG. 2 operates during another embodiment of a game of hybrid "jacks-or-better" draw poker. In this embodiment, players receive initial hands comprising electronic, random card values from processor 200 and mechanically-generated cards are used to provide replacement card values to players. It should be understood that the steps described in this method could be performed in an order other than what is shown and discussed.

At block 1102, five cards are dealt from a deck of physical playing cards at location 1102, representing "contingent" or replacement cards that are provided to players later during game play. The cards are typically dealt face down, however the values of these cards are detected by detector 106 and then provided to gaming server 108 via communication network 116 at block 1104. These card values may provide an indication to gaming server 108 that mechanically-generated game values are available for use by gaming server 108.

At block 606, gaming sever 108 provides an indication that it is ready to host a game of jacks-or-better draw poker, typically by providing a web page having a way for remote game players to sign into the game, register, or otherwise indicate that they would like to participate in game play.

At block 1108, one or more players sign up, register, or otherwise provide an indication to gaming server 108 that they would like to participate in the game. In one embodiment, game play begins when a predetermined number of players sign in. In another embodiment, play beings after a predetermined time period has expired after gaming server 108 provides the indication at block 1106. Players may request to play against a particular dealer and/or one or more other remote game participants.

In one embodiment, as players provide requests to play the game, processor 200 may assign the players into groups at block 1110. For example, before game play, processor 200 may define a first group of players as a first number of players who submit a request to play a game and a second group of players comprising a second number of players requesting game play. A group may comprise a single game player. Each of the players in both groups play the same game of jacks-or-better poker using contingent or replacement card values generated at location 102. However, in one embodiment, one group of players receives electronic, random game values provided from a first set of possible game values by processor 200, and the second group of players receives electronic, random game values provided to the second group from a second set of possible game values. For example, the first group of players may receive electronic, random card values from a first "electronic deck" of cards, e.g., 52 card values relating to an mechanically-generated deck of cards, less any mechanically-generated card values received from location 102 or previously provided to players in the first group. The second group of players may receive electronic, random card values from a second "electronic deck" of cards, e.g., 52 card values relating to an mechanically-generated deck of cards, less any mechanically-generated card values received from location 102 or previously provided to players in the second group.

In any case, at block 1112, each player wishing to participate in the current game places a wager via communication network 116 using an electronic device operated by each player.

At block 1114, processor 200 excludes, removes, or otherwise makes unavailable the contingent card values received at block 1104 from further consideration by processor 200 before or during random, electronic card value selection/generation to players, as explained previously herein.

In block 1116, processor 200 provides an initial five card poker hand to each player, each hand comprising five electronic, random card values from a set of possible card vales, such as 52 card values relating to a typical deck of playing cards. In an embodiment where two or more groups have been defined, processor 200 provides players in each group with electronic random card values from a respective set of card values, as explained previously herein.

At block 1118, another bet may be accepted by processor 200 from any of the players.

At block 1120, processor 200 receives an indication from the players identifying card values to keep and/or card values to discard in anticipation of drawing additional cards, from the initial five cards provided at block 1116.

At block 1122, processor 200 may provide a request to location 102 to reveal the five contingent cards 702 so that a camera may provide video and/or audio signals of the cards to players, either through communication network 116 or a second communication network, such as a television network. The request may be presented to a dealer at location 102 via dealer interface 118.

At block 1124, processor 200 reveals a number of mechanically-generated contingent cards to each player generated at block 1102, the number of contingent cards based on the number of cards each player has chosen to keep (and/or discard).

At block 1126, a final bet may be accepted by processor 200 from any of the players.

At block 1128, processor 200 determines the value of each player's final hands. Each player's final hand comprises a number of initial cards that were held plus a number of replacement cards provided at block 1124.

At block 1130, processor 200 evaluates each of the player's final hands to determine whether each player's hand has exceeded a predetermined threshold, such as a pair of jacks. If so, processor 200 reconciles accounts associated with player's having a winning hand in accordance with pre-determined pay-out information stored within memory 202, at block 1132.

At block 1134, processor 200 and/or the dealer at location 102, may invite the winner(s) of the previous round of play to provide information over communication network 116, the information comprising a still image, video information, or audio information pertaining to the winner. In another embodiment, processor 200 and/or the dealer may invite any player having a final hand equal to or exceeding a rare hand to provide information, for example, if any player's hand comprises four of a kind or a straight flush. The winner(s) could use a web-camera to send a real video and audio signal that is provided to the other game players. For instance, the winner(s) may playfully taunt the other players or provide a comment as to the previous round of play, or any other comments the winner(s) might have. In this way, the game players feel more like they are participating in a real poker game, which may add to their enjoyment of playing games of chance using system 100.

After block 1134, the next round of play may be initiated, i.e., blocks 1102 through 1134 may be repeated, taking into account any new players that have joined the game and any players who have dropped out.

FIGS. 12-15 are flow diagrams illustrating various embodiments for allowing one or more players to participate in multiple, simultaneous games played at two or more virtual gaming tables provided by a central gaming server. For example, one player may play a game of poker simultaneously at eight virtual gaming tables using the same mechanically-generated cards, or electronically-generated card values, used at each virtual gaming table against other participants assigned to the virtual gaming tables by the central gaming server. The mechanically-generated cards or electronically-generated card values dealt to the player are excluded from being provided to the other game participants at the virtual tables. Typically, the player's card values are excluded from multiple sets of possible electronic card values, each set being associated with a participating virtual gaming table.

Figure 12:
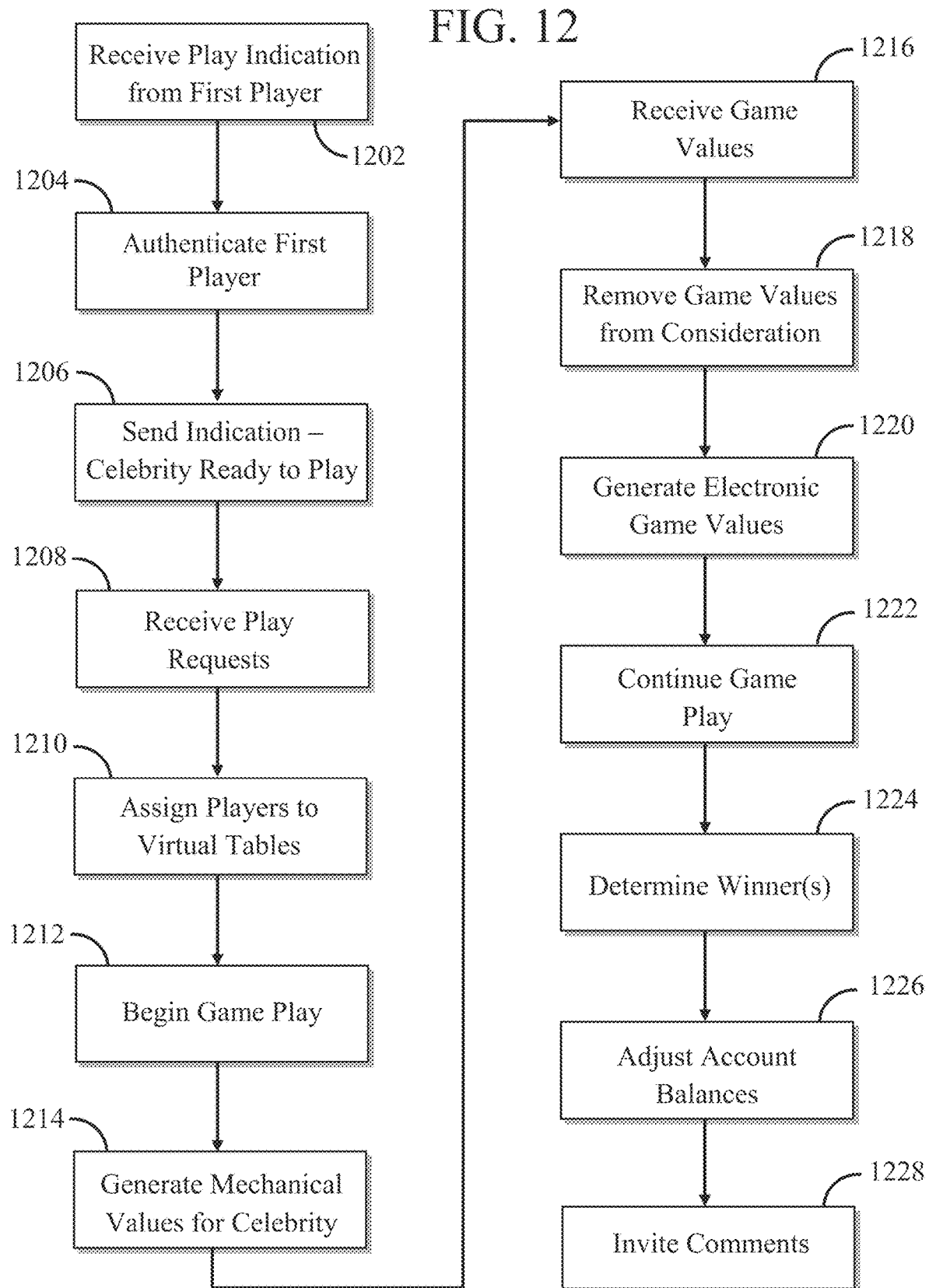
FIG. 12 is a flow diagram illustrating one embodiment of a gaming method where a first player may simultaneously participate in one more "virtual" games by playing at a physical gaming table.

FIG. 12 is a flow diagram 1200 illustrating an embodiment of a gaming method where a first player may simultaneously participate in one more "virtual" games by playing at a physical table, typically co-hosted by a live dealer also at the physical table. Each of the virtual games is managed by gaming server 108, offering game play to remote game players over network 116. In this embodiment, mechanically-generated game values are provided by the live dealer to the first player, typically from a physical deck of playing cards. Mechanically-generated game values may also be provided as contingency cards, as that term is described above. Generally, the purpose of the contingency game values is to accommodate those players or possibly the dealer to complete their game participation, in accordance with the rules of the game being played, which otherwise may not be able to finalize their play without the contingency values. Contingency game values are shared values that may be used by all or some players or the dealer in a game. Mechanically-generated game values may also comprise "community cards", which are cards that are used by two or more players to construct their respective card hands. In this embodiment, the first player is herein referred to as the "first remote player" or, alternatively, "remote celebrity" or "celebrity player".

Although the method described with respect to FIG. 12 describes two or more game of Texas Hold 'Em, the principles described could be applied to several other types of games, including virtually any other version of poker or other casino games. It should be understood that the steps described in this method could be performed in an order other than what is shown and discussed, and that some steps may be omitted without departing from the inventive concepts of the invention.

The process described in FIG. 12 may be best used to entice remote player participation in games by having one or more celebrity players to participate in one or more virtual games played simultaneously. For example, the process of FIG. 12 may allow a celebrity to play Texas Hold 'Em (or virtually any version of poker, blackjack, or other game) at a physical gaming table as a participant in one or more virtual gaming tables using the celebrity's actual cards, and/or community/contingent cards, against remote game players participating via a player electronic device, network 116, and gaming server 108, e.g., at one or more virtual tables. At the conclusion of game play, one or more winners are determined by taking into account remote player's electronic card values, celebrity's card values, and/or a dealer or house entity's card values. An example of this embodiment is provided as follows.

In one embodiment, traditional wagering may be altered so that the celebrity player is able to play multiple, simultaneous games against players on multiple virtual gaming tables. For example, in many types of poker games, numerous betting opportunities traditionally exist (e.g., an initial round before any game values are provided, a betting round immediately after initial game values are provided, one or more intermediate rounds of wagering, and a final wagering opportunity after players have received/constructed their final "hands"). In this embodiment, the number of rounds of betting may be reduced in order to make the game more manageable for the celebrity player. For example, in a game of Texas Hold 'Em, wagering may only be allowed after initial hands are provided, after the flop, and a final round of wagering after the river, and/or the wagering rounds maybe limited to a fixed number of rounds, for example two rounds, and/or wagering may be limited to only pre-established dollar values.

In a related embodiment, the celebrity player is provided information pertaining to each virtual gaming table that the celebrity is currently active. For example, a celebrity at location 102 may be playing against remote players distributed among 8 virtual gaming tables by gaming server 108. In this embodiment, the celebrity player at location 102 is provided an electronic display device, shown as display 124 in FIG. 1, which provides a visual indication of game play at each virtual gaming table that the celebrity player is involved in. In another embodiment, the visual indication is provided to a personal electronic communication device used by the celebrity player, for example, a mobile telephone, tablet computer, or the like.

The visual indication may, in one embodiment, comprise a status summary of each game that the celebrity player is active. For example, in a game of Texas Hold 'Em where the celebrity player is playing against remote players at six virtual gaming tables, display 124 may display a table summarizing each of the games, using information such as a virtual table identification code (e.g., a table number), a number of players actively participating in any particular game at each table, the number of players who have placed a wager, called, and/or raised during a particular round of play and an identification of which player placed the wager, called, and/or raised, various financial information (such as the amount of a present wager, a dollar amount of the "pot" at each virtual gaming table during game play, etc.), and/or one or more indications of the type of action required from the celebrity player at any particular time during game play (e.g., need to bet or "check" at table 1, need to call, raise, or fold at table 2, etc.).

At block 1202, gaming sever 108 receives an indication from a first player that the first player would like to play a game that is offered by gaming server 108. For purposes of discussion, in this embodiment, the first player comprises a public figure, such as a celebrity, actor, musician, dancer, business tycoon, poker champion, or any other person that is well-known to the general public. In one embodiment, the indication may be provided electronically by a dealer, player, or those located at a physical gaming table, for example, inside a casino or other authorized gaming establishment, on behalf of the first player using dealer interface 118. The indication may initiate a "new" game, or it may comprise a request to join a virtual game already in progress. In one embodiment, other players could join the celebrity at the physical gaming table to play the game along with the celebrity.

In one embodiment, at block 1204, the celebrity is authenticated to ensure that the first player at the physical gaming table is, in fact, the celebrity that he or she purports to be. In one embodiment, authentication may be performed by the dealer by reviewing one or more forms of identification, such as a driver's license. Alternatively, or in addition, the first player may provide one or more items of authentication information to gaming server 108 for authentication, such as a code sent by gaming server 108 to a token in physical possession of the first player, fingerprint identification, facial identification, or any other means to authenticate the first player as a celebrity.

In one embodiment, gaming server 108 comprises a database stored in memory 202 of a list of persons considered to be worthy of "celebrity" status. Gaming server 108 typically compares information in the indication to the pre-defined list to determine whether or not to afford celebrity status to the person providing the indication. If a match is determined by gaming server 108, then the person that provided the indication is given celebrity status, meaning that the person providing the indication may be used to attract other players to play against the person, and/or allow the person to play at one or more virtual gaming tables, as discussed below.

At block 1206, gaming server 108 may provide an indication to a web page hosted by gaming server 108 that the celebrity is going to participate in a game offered by gaming server 108 and that other players may play against the celebrity via gaming server 108.

At block 1208, one or more play requests or indications are received by gaming server 108 from one or more remote game players that wish to play the game with/against the celebrity. Each of the remote game players typically provides such an indication using a web browser running on a respective personal computer, tablet, smartphone, or other network-connected device.

At block 1210, players are assigned to one or more virtual game tables or positions after gaming server 108 receives the indications, with one of the positions at each virtual gaming table occupied by the celebrity. In one embodiment, game play begins when a predetermined number of players are "seated" at the virtual gaming tables. In another embodiment, play begins after a predetermined time period has expired from the time the celebrity provided the indication to play at block 1202.

The players assigned to each virtual gaming table or position play the same game type against other virtual players and the celebrity and the dealer in case of house banked games. For example, if 27 remote game players wish to join the celebrity in a game of Texas Hold "Em, 3 virtual gaming tables may be created by gaming server 108, each virtual table having 10 player positions. Each table would comprise as many as 9 remote players and the celebrity player. During game play, the celebrity player's game values would be used by the celebrity player against the remote players at each virtual table that he or she participated in. In addition, the values of five, mechanically-generated (e.g., dealt from a deck of physical playing cards) "community" cards, dealt by the dealer, are provided to each of the three virtual tables for use by the players at each table to construct their hands during game play.

At block 1212, game play begins. In the case of Texas Hold 'Em, an initial wager is typically received by gaming server 108 from one or more game players at each of the three virtual gaming tables or the first player at the physical gaming table, prior to any card values being given. For example, a "big blind" and a "small blind" are received from two players at each virtual table or a combination of the celebrity and one player at each virtual table. In other embodiments, one or more "antes" are received from one or more players and/or the celebrity player. Alternatively the operator may take a rake, a commission or a fee from the players or may decide not to charge the players and receive revenues from sponsors or internet advertisers.

At block 1214, mechanically-generated game values are generated by mechanical device 106/detector 106, in one embodiment, in the form of an initial card hand for the celebrity player. In addition, a number of physical playing cards representing any community and/or contingency game values needed to ensure completion of at least one round of game play. The cards may be dealt face up or face down, depending on the game that is being played. In addition, one or more "burn" cards may be generated, which are dealt from a deck of cards, but not used by any player or house entity during game play. Burn cards have traditionally been used to deter a form of cheating known as "card marking", in which a player alters the back of a playing card in order to gain an unfair informational advantage.

For example, in one embodiment, a game of draw poker may be played among a celebrity located at a physical gaming table, a first set of three remote game participants playing electronically against the dealer or against each other and the celebrity at the physical gaming table, and a second set of three remote game players playing electronically against each other and against the celebrity located at the physical gaming table. As an example, after an initial bet/ante is received by the dealer from the celebrity and an indication of the bet/ante provided to gaming server 108, and initial bets/antes received by gaming server 108 from the remote players placed via the remote players' respective electronic devices and communication network 116, the live dealer provides five physical playing cards to the celebrity and deals five physical contingency cards face down for possible future use by the celebrity in one or more later rounds of play. The contingency cards may be used to supply "draw" cards to the celebrity later during the game if the celebrity wishes to substitute between 1 and 5 cards in his or her hand, in accordance with the rules of draw poker.

In other games, the celebrity will receive whatever necessary physical playing cards from the dealer, and the dealer will deal whatever contingency cards are necessary, as described above with respect to FIGS. 3-6 and 10 and depending on the type of game being played.

As the mechanically-generated game values are being generated at block 1214, detector 106 determines the game values and provides an indication of the game values to gaming server 108 via network 116. Indications of the game values are received at block 1216.

At block 1218, processor 200 removes the mechanically-generated game values received at block 1214 from consideration by processor 200 before, or during, a process of providing electronic, random game values to remote players. This may be accomplished by any of the methods described above with respect to FIGS. 3-6 and 10, or any other method for removing, excluding, or eliminating mechanically-generated values from future consideration during game play.

In one embodiment, the mechanically-generated game values received at block 1216 are excluded from each set of possible game values associated with each virtual table. For example, in a game of Texas Hold 'Em comprising the celebrity player at a physical gaming table, and two sets of remote players playing on two virtual gaming tables, respectively, the celebrity player's initial two cards/game values, as well as at least five contingency/community cards, are excluded from further game play by processor 200 from a first set of game values (e.g., 52 electronic game values, each corresponding to one card out of a standard deck of 52 playing cards) associated with the first virtual table, as well as being excluded from further game play by processor 200 from a second set of game values (e.g., a second set of 52 electronic game values, each corresponding to one card out of a standard deck of 52 playing cards) associated with the second virtual table. The first set of game values is used to provide random, electronic game values to remote players at the first virtual gaming table during game play, while the second set of game values is used to provide random, electronic game values to remote players at the second virtual gaming table during game play. Thus, each virtual table uses a unique set of electronic game values for game play among the remote players, each set excluding game values corresponding to the mechanically-generated game values received at block 1216.

At block 1220, processor 200 generates electronic, random game values for each remote player at each of the virtual gaming tables, using randomly selected game values from respective sets of game values for each virtual table, excluding any mechanically-generated game values received at block 1216, and further excluding any electronic game values that have already been provided to other remote players on their respective virtual gaming tables. For example, in Texas Hold 'Em, processor 200 generates two, random electronic card values for each of the remote players, the two cards representing an initial hand for each player.

At block 1222, game play continues at each virtual table, including the celebrity at the actual gaming table at location 102. In general, any further game values needed to complete game play are provided by either mechanical device 104/detector 106 or by processor 200 either by performing the electronic, random game value generation process described above, excluding any mechanically-generated or processor-generated game values already in play, or by simply revealing the mechanically-generated game values received by gaming server 108 at block 1216. Processor 200 controls game play, typically by providing requests, indications, and/or cues to or from the dealer and/or players to provide responses in the form of game flow (e.g. initiating a betting round) or game play choices (e.g., "hit", "stick", "fold", "call", "raise", wagering amounts, etc.). In Texas Hold 'Em, processor 200 reveals the community card values to the players in conformance with the rules of the game and allows wagering to occur as the community card values are revealed.

At block 1224, processor 200 determines one or more game winners for each virtual gaming table, based on the scores, values, information, and/or indications of/from each player and/or processor 200.

At block 1226, processor 200 adjusts account balances affected by the game results determined at block 1222, and may provide updated account balances to players.

At block 1228, processor 200 may generate an invitation for winning players to provide comments regarding the previous round of play. In another embodiment, processor 200 provides an indication of winners to the dealer at location 102 via dealer interface 118 and the dealer provides a verbal invitation for winning player(s) to provide comments over communication network 116. In either of the above embodiments, an indication could be provided, either by processor 200 and/or the dealer at location 102, of a general identity and/or location of a player who has received a rare game result, such as receiving a royal flush in a game of draw poker. Winners could respond to the invitation by sending audio/video signals or textual responses to gaming server 108, where they could be forwarded to other game players and/or the dealer. In this way, game players feel more connected to other players and/or the dealer, which may add to their enjoyment of playing games online using gaming system 100.

Figure 13:
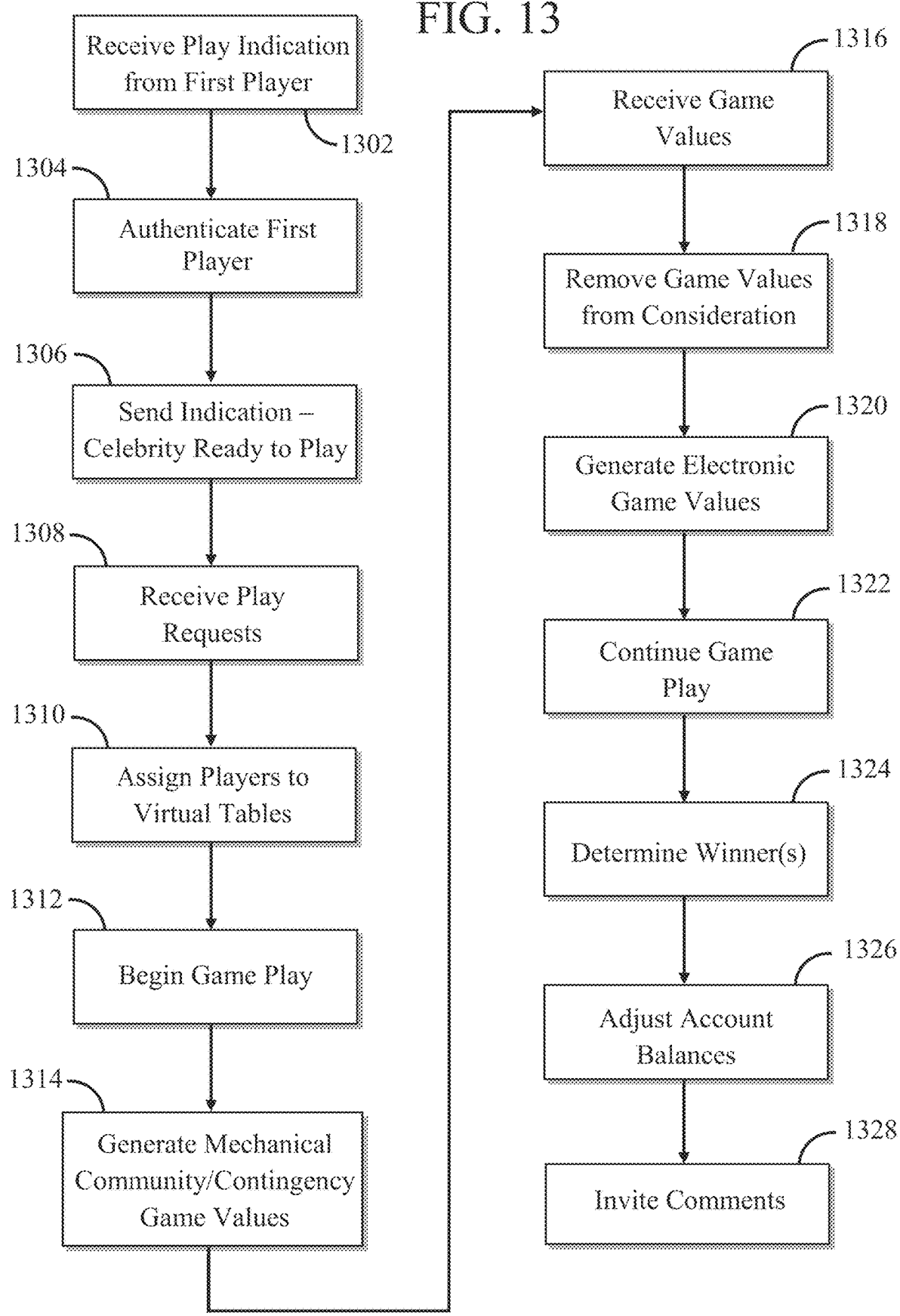
FIG. 13 is a flow diagram illustrating one embodiment of a multi-table gaming method where a first player may simultaneously participate in a two or more "virtual" games using a network-enabled electronic device, and mechanically-generated game values provided at a remote location.

FIG. 13 is a flow diagram 1300 illustrating an embodiment of a multi-table gaming method where a first player may simultaneously participate in a two or more "virtual" games using a network-enabled electronic device (such as a computer, tablet, or smartphone), and mechanically-generated game values relating to games are provided at a remote location, such as location 102 shown in FIG. 1. Such a player is referred to, in this embodiment, as the "first remote player" or, alternatively, "remote celebrity" or "celebrity player". Each of the virtual games is managed by gaming server 108, offering game play to the first player and remote game players over network 116. In this embodiment, mechanically-generated game values may comprise contingency cards and/or community cards, described in earlier embodiments herein.

Although the method described with respect to FIG. 13 describes two or more games of Texas Hold 'Em, the principles described could be applied to several other types of games, including virtually any other version of poker. It should be understood that the steps described in this method could be performed in an order other than what is shown and discussed, and that some steps may be omitted without departing from the inventive concepts of the invention.

The process described in FIG. 13 may be best used to entice remote player participation in games by allowing one or more celebrity players to participate in one or more virtual games simultaneously, without the celebrity having to be physically located at an authorized gaming establishment, as in the case of the method described in FIG. 12.

In one embodiment, traditional wagering may be altered so that the celebrity player is able to play multiple, simultaneous games against players on multiple virtual gaming tables, as explained above with respect to the method described by FIG. 12.

In a related embodiment, the celebrity player is provided information pertaining to each virtual gaming table that the celebrity is currently active, also described above. For example, a celebrity may be playing against remote players distributed among 8 virtual gaming tables by gaming server 108. In this embodiment, the celebrity player is provided information via his or her network-enabled electronic device relating to each virtual gaming table that the celebrity player is involved in. In another embodiment, the information is provided to a device other than the network-enabled electronic device, such as a television set.

The information may, in one embodiment, comprise a status summary of each game that the celebrity player is active. For example, in a game of Texas Hold 'Em where the celebrity player is playing against remote players at six virtual gaming tables, the information may comprise a table summarizing each of the games, using information such as a virtual table identification code (e.g., a table number), a number of players actively participating in any particular game at each table, the number of players who have placed a wager, called, and/or raised during a particular round of play and an identification of which player placed the wager, called, and/or raised, various financial information (such as the amount of a present wager, a dollar amount of the "pot" at each virtual gaming table during game play, etc.), and/or one or more indications of the type of action required from the celebrity player at any particular time during game play (e.g., need to bet or "check" at table 1, need to call, raise, or fold at table 2, etc.).

At block 1302, gaming sever 108 receives an indication from a first player that the first player would like to play a game that is offered by gaming server 108. For purposes of discussion, in this embodiment, the first player comprises a public figure, such as an actor, musician, dancer, business tycoon, poker champion, or any other person that is well-known to the general public. In one embodiment, the indication is provided by a network-enabled electronic device, such as a computer, tablet computer, smartphone, or other device, in response to the first player taking an action, such as entering a game selection into the network-enabled electronic device via a keyboard, mouse, voice-recognition system, etc. The indication may initiate a "new" game, or it may comprise a request to join a virtual game already in progress.

In one embodiment, at block 1304, the first player is authenticated to ensure that the first player is, in fact, the celebrity that he or she purports to be. In one embodiment, the first player provides one or more items of authentication information to gaming server 108 for authentication, such as a username and password, an answer to a pre-arranged "security question", a code sent by gaming server 108 to a token in physical possession of the first player, a fingerprint, a scanned image of the first person's face for processing by a facial identification system, or any other means to authenticate the first player as a celebrity.

In one embodiment, gaming server 108 comprises a database stored in memory 202 listing persons considered to be worthy of "celebrity" status. Gaming server 108 typically compares information in the indication to the pre-defined list to determine whether or not to afford celebrity status to the person providing the indication. If a match is determined by gaming server 108, then the person that provided the indication is given celebrity status, meaning that the person providing the indication may be used to attract other players to play against the person, and/or allow the person to play at one or more virtual gaming tables, as discussed below.

At block 1306, gaming server 108 may provide an indication to a web page hosted by gaming server 108 that the celebrity is going to participate in a game offered by gaming server 108 and that other players may play against the celebrity via gaming server 108.

At block 1308, one or more play requests, or indications, are received by gaming server 108 from one or more remote game players that wish to play the game with/against the celebrity. Each of the remote game players typically provides such an indication using a web browser running on a respective personal computer, tablet, smartphone, or other network-connected device.

At block 1310, players are assigned to one or more virtual game tables after gaming server 108 receives the indications, with one of the positions at each virtual gaming table occupied by the celebrity. In one embodiment, game play begins when a predetermined number of players are "seated" at the virtual gaming tables. In another embodiment, play beings after a predetermined time period has expired from the time the celebrity provided the indication to play at block 1302.

The players assigned to each virtual gaming table play the same game type against other players and the celebrity at each virtual gaming table, respectively. For example, if 27 remote game players wish to join the celebrity in a game of Texas Hold "Em, 3 virtual gaming tables may be created by gaming server 108, each virtual table having 10 player positions. Each table would comprise 9 remote players and the celebrity player. During game play, the celebrity player's game values provided by gaming server 108 are used by the celebrity player against the remote players at each virtual table that was created. In addition, the values of mechanically-generated game values at location 102 (e.g., "community cards" and/or "contingency cards") are provided to some or all the remote players at each table and/or the celebrity player to construct their hands during game play.

At block 1312, game play begins. In Texas Hold 'Em, an initial wager is typically received by gaming server 108 from one or more game players at each of the three virtual gaming tables and/or the celebrity player over network 116. For example, a "big blind" and a "small blind" are received from two players at each virtual table. In other embodiments, one or more "antes" are received from one or more players.

At block 1314, mechanical device 104/detector at location 102 generates a number of physical game values, in this example, physical playing cards, representing "contingency" cards needed to ensure completion of at least one round of game play and/or "community" cards that are used by more than one player to complete game play, as described above with respect to FIGS. 3-6 and 10. "Burn" cards may also be generated.

For example, in one embodiment, a game of Texas Hold 'Em may be played among a first set of three remote game players playing electronically against each other and electronically against the celebrity and a second set of three remote game players playing electronically against each other and electronically against the celebrity. At block 1314, game values (such as physical playing cards) are dealt representing five "community" cards that are used by each player to construct their hands.

As the mechanically-generated game values are being generated at block 1314, detector 106 determines the game values and provides an indication of the game values to gaming server 108 via network 116. Indications of the game values are received at block 1316.

At block 1318, processor 200 removes the mechanically-generated game values received at block 1316 from consideration by processor 200 before, or during, a process of providing electronic, random game values to remote players. This may be accomplished by any of the methods described above with respect to FIGS. 3-6 and 10, or any other method for removing, excluding, or eliminating mechanically-generated values from future consideration during game play.

In one embodiment, the mechanically-generated game values received at block 1316 are excluded from each set of possible game values associated with each virtual table. For example, in a game of Texas Hold 'Em comprising the celebrity player using a network-enabled electronic device to play two simultaneous games of Texas Hold 'Em on two virtual gaming tables against two sets of remote players also using respective network-enabled electronic devices, some playing on the first virtual gaming table and some on the other table, at least five community cards are excluded from further game play by processor 200 from a first set of game values (e.g., 52 electronic game values, each corresponding to one card out of a standard deck of 52 playing cards) associated with the first virtual table, as well as being excluded from further game play by processor 200 from a second set of game values (e.g., a second set of 52 electronic game values, each corresponding to one card out of a standard deck of 52 playing cards) associated with the second virtual table.

At block 1320, processor 200 generates electronic, random game values for the celebrity player and excludes these game values from being provided to other remote game players assigned to each virtual gaming table that the celebrity player is engaged. After the celebrity's game values are excluded from being provided to other remote players, processor 200 provides each remote player at each of the virtual gaming tables one or more randomly-selected game values from the respective sets of possible game values for each virtual table, excluding any mechanically-generated game values received at block 1316, and further excluding any electronic game values that have already been provided to remote players on their respective virtual gaming tables.

At block 1322, game play continues at each virtual table. In general, any further game values needed to complete game play are provided by either mechanical device 104/detector 106 or by processor 200 performing the electronic, random game value generation process described above, excluding any mechanically-generated game values provided at block 1316 or processor-generated game values already in play. Processor 200 controls game play, typically by providing requests, indications, and/or cues to or from the dealer and/or players to provide responses in the form of game flow (e.g. initiating a betting round) or game play choices (e.g., "hit", "stick", "fold", "call", "raise", wagering amounts, etc.). In Texas Hold 'Em, gaming server 108 reveals the community card values to the players in conformance with the rules of the game and allows wagering to occur as the community card values are revealed.

At block 1324, processor 200 determines one or more game winners for each virtual gaming table, based on the scores, values, information, and/or indications of/from each player and/or processor 200.

At block 1326, processor 200 adjusts account balances affected by the game results determined at block 1322, and may provide updated account balances to players.

At block 1328, processor 200 may generate an invitation for winning players to provide comments regarding the previous round of play. In another embodiment, processor 200 provides an indication of winners to the dealer at location 102 via dealer interface 118 and the dealer provides a verbal invitation for winning player(s) to provide comments over communication network 116. In either of the above embodiments, an indication could be provided, either by processor 200 and/or the dealer at location 102, of a general identity and/or location of a player who has received a rare game result, such as receiving a royal flush in a game of draw poker. Winners could respond to the invitation by sending audio/video signals or textual responses to gaming server 108, where they could be forwarded to other game players and/or the dealer. In this way, game players feel more connected to other players and/or the dealer, which may add to their enjoyment of playing games online using gaming system 100.

Figure 14:
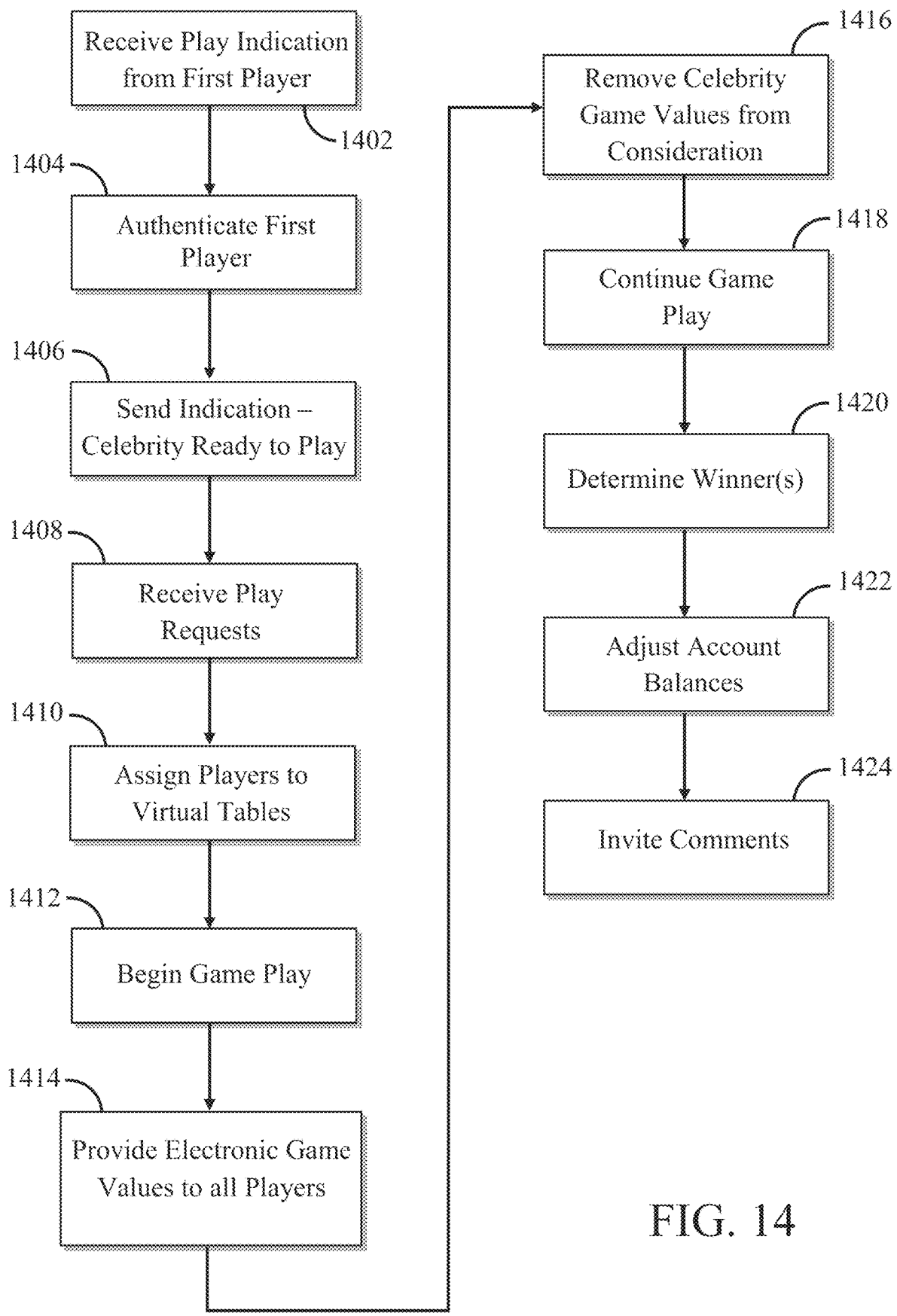
FIG. 14 is a flow diagram illustrating one embodiment of a multi-table gaming method where a first player may simultaneously participate in a two or more "virtual" games using a network-enabled electronic device, playing against other remote players, each using a respective network-enabled electronic device.

FIG. 14 is a flow diagram 1400 illustrating an embodiment of a multi-table gaming method where a first player may simultaneously participate in a two or more "virtual" games using a network-enabled electronic device (such as a computer, tablet, or smartphone), playing against other remote players, each using a respective network-enabled electronic device. In this embodiment, all game values are generated electronically by processor 200 at gaming server 108. The first player is herein referred to, in this embodiment, as the "first remote player" or, alternatively, "remote celebrity" or "celebrity player". Each of the virtual games is managed by gaming server 108, offering game play to the first player and remote game players over network 116.

Although the method described with respect to FIG. 14 describes two or more game of Texas Hold 'Em, the principles described could be applied to several other types of games, including virtually any other version of poker. It should be understood that the steps described in this method could be performed in an order other than what is shown and discussed, and that some steps may be omitted without departing from the inventive concepts of the invention.

The process described in FIG. 14 may be best used to entice remote player participation in games by allowing one or more celebrity players to participate in one or more virtual games simultaneously, without the celebrity having to be physically located at an authorized gaming establishment, as in the case of the method described in FIG. 12.

In one embodiment, traditional wagering may be altered so that the celebrity player is able to play multiple, simultaneous games against players on multiple virtual gaming tables, as explained above with respect to the method described by FIGS. 12 and 13.

In a related embodiment, the celebrity player is provided information pertaining to each virtual gaming table that the celebrity is currently active, also described above.

At block 1402, gaming sever 108 receives an indication from a first player that the first player would like to play a game that is offered by gaming server 108. For purposes of discussion, in this embodiment, the first player comprises a public figure, such as an actor, musician, dancer, business tycoon, poker champion, or any other person that is well-known to the general public. In one embodiment, the indication is provided by a network-enabled electronic device, such as a computer, tablet computer, smartphone, or other device, in response to the first player taking an action, such as entering a game selection into the network-enabled electronic device via a keyboard, mouse, voice-recognition system, etc. The indication may initiate a "new" game, or it may comprise a request to join a virtual game already in progress.

In one embodiment, at block 1404, the celebrity is authenticated to ensure that the player is, in fact, the celebrity that he or she purports to be. In one embodiment, the first player provides one or more items of authentication information to gaming server 108 for authentication, such as a username and password, an answer to a pre-arranged "security question", a code sent by gaming server 108 to a token in physical possession of the first player, a fingerprint, a scanned image of the first person's face for processing by a facial identification system, or any other means to authenticate the first player as a celebrity.

In one embodiment, gaming server 108 comprises a database stored in memory 202 listing persons considered to be worthy of "celebrity" status. Gaming server 108 typically compares information in the indication to the pre-defined list to determine whether or not to afford celebrity status to the person providing the indication. If a match is determined by gaming server 108, then the person that provided the indication is given celebrity status, meaning that the person providing the indication may be used to attract other players to play against the person, and/or allow the person to play at one or more virtual gaming tables, as discussed below.

At block 1406, gaming server 108 may provide an indication to a web page hosted by gaming server 108 that the celebrity is going to participate in a game offered by gaming server 108 and that other players may play against the celebrity via gaming server 108.

At block 1408, one or more play requests, or indications, are received by gaming server 108 from one or more remote game players that wish to play the game with/against the celebrity. Each of the remote game players typically provides such an indication using a web browser running on a respective personal computer, tablet, smartphone, or other network-connected device.

At block 1410, players are assigned to one or more virtual game tables after gaming server 108 receives the indications, with one of the positions at each virtual gaming table occupied by the celebrity. In one embodiment, game play begins when a predetermined number of players are "seated" at the virtual gaming tables. In another embodiment, play beings after a predetermined time period has expired from the time the celebrity provided the indication to play at block 1402.

The players assigned to each virtual gaming table play the same game type against other players and the celebrity at each virtual gaming table, respectively. For example, if 27 remote game players wish to join the celebrity in a game of Texas Hold "Em, 3 virtual gaming tables may be created by gaming server 108, each virtual table having 10 player positions. Each table would comprise 9 remote players and the celebrity player. During game play, the celebrity player's game values provided by gaming server 108 are used by the celebrity player against the remote players at each virtual table that was created.

At block 1412, game play begins. In Texas Hold 'Em, an initial wager is typically received by gaming server 108 from one or more game players at each of the three virtual gaming tables and/or the celebrity player over network 116. For example, a "big blind" and a "small blind" are received from two players at each virtual table. In other embodiments, one or more "antes" are received from one or more players.

At block 1414, processor 200 provides initial game values to each of the players at the various virtual gaming tables.

Electronic game values for each virtual table is selected by processor 200 from a respective set of possible game values used with each virtual table. In other words, each virtual gaming table uses its own "deck of electronic cards" to provide electronic card game values to players at each particular virtual gaming table. However, the celebrity player receives only one set of initial card game values, no matter how many virtual gaming tables the celebrity player is "seated". In other words, the initial card game values provided to the celebrity player are used by the celebrity player at each game that the celebrity player is involved.

At block 1416, as a result of the celebrity player receiving only one set of initial card game values, processor 200 excludes the game values that were provided to the celebrity player from one or more sets of possible game values associated with each virtual gaming table that the celebrity player is involved with, so that they may not be provided to other players in future action during the round of game play. The exclusion of the celebrity player's game values may be accomplished by any of the methods described above with respect to FIGS. 3-6 and 10, or any other method for removing, excluding, or eliminating game values from a set of possible game values.

At block 1418, game play continues at each virtual table. In general, any further game values needed to complete game play are provided by processor 200 performing the electronic, random game value generation process described above, excluding any processor-generated game values from the one or more sets of possible game values associated with the one or more virtual gaming tables for each electronic card value provided to the celebrity player. In one embodiment, processor 200 generates five community card values from a set of possible card values for use as community cards in games that require community cards, such as Texas Hold 'Em. Community card values may be generated in the same or different quantities for other variations of poker, or blackjack (community card values being the dealer's card values). The five community card values in Texas Hold 'Em are used as community cards at each of the virtual tables that the celebrity player is involved. In other words, all of the players at each virtual table construct final hands using initial card values provided by processor 200, from a set of possible game values unique to each table minus initial card values provided to the celebrity player, plus the same five electronic community card values generated by processor 200. In another embodiment, processor 200 generates a different community card set for each virtual table.

Processor 200 controls game play, typically by providing requests, indications, and/or cues to or from the dealer and/or players to provide responses in the form of game flow (e.g. initiating a betting round) or game play choices (e.g., "hit", "stick", "fold", "call", "raise", wagering amounts, etc.). In Texas Hold 'Em, gaming server 108 reveals the community card values to the players in conformance with the rules of the game and allows wagering to occur as the community card values are revealed. Any further game values provided to the celebrity player and community game values during game play are excluded as potential game values to other players at the virtual tables.

At block 1420, processor 200 determines one or more game winners for each virtual gaming table, based on the scores, values, information, and/or indications of/from each player and/or processor 200.

At block 1422, processor 200 adjusts account balances affected by the game results determined at block 1420, and may provide updated account balances to players.

At block 1424, processor 200 may generate an invitation for winning players to provide comments regarding the previous round of play. Further, an indication may be provided by processor 200, of a general identity and/or location of a player who has received a rare game result, such as receiving a royal flush in a game of draw poker. Winners could respond to the invitation by sending audio/video signals or textual responses to gaming server 108, where they could be forwarded to other game players. In this way, game players feel more connected to other players, which may add to their enjoyment of playing games online using gaming system 100.

Figure 15:
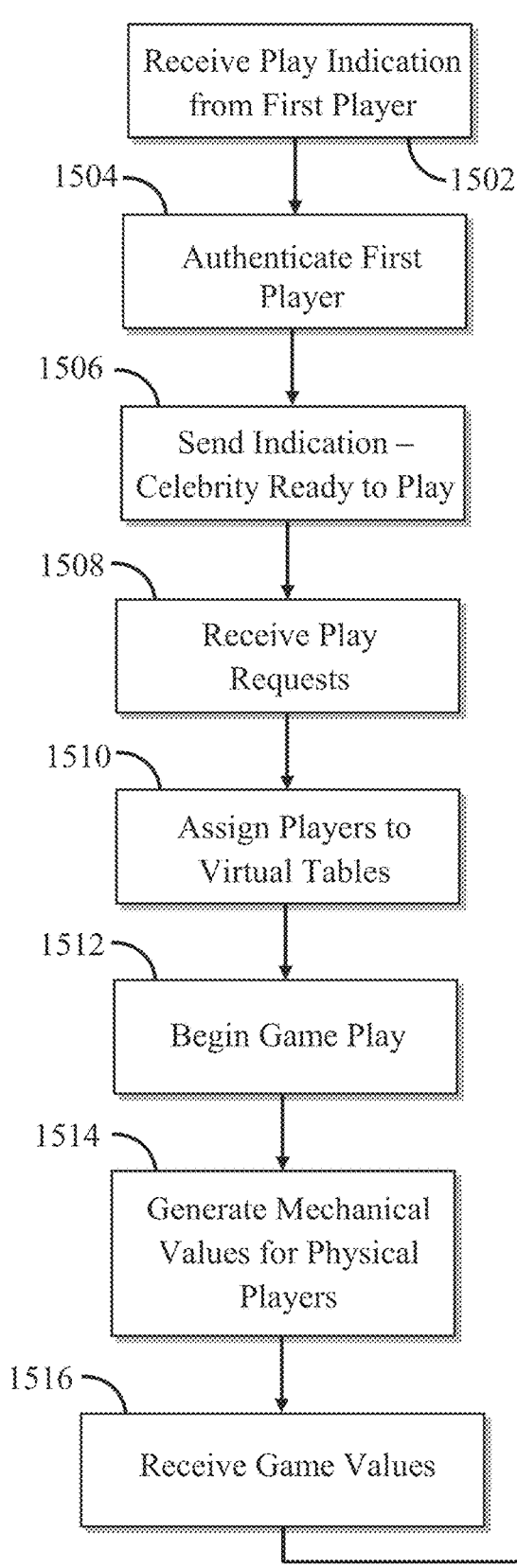
FIG. 15 is a flow diagram illustrating one embodiment of a multi-table gaming method where a first player may simultaneously participate in a one or more "virtual" games using a network-enabled electronic device in communication with a gaming server and against one or more players located at a remote location, such as location 102 shown in FIG. 1, and playing on a physical gaming table with a live dealer.
Figure 15:
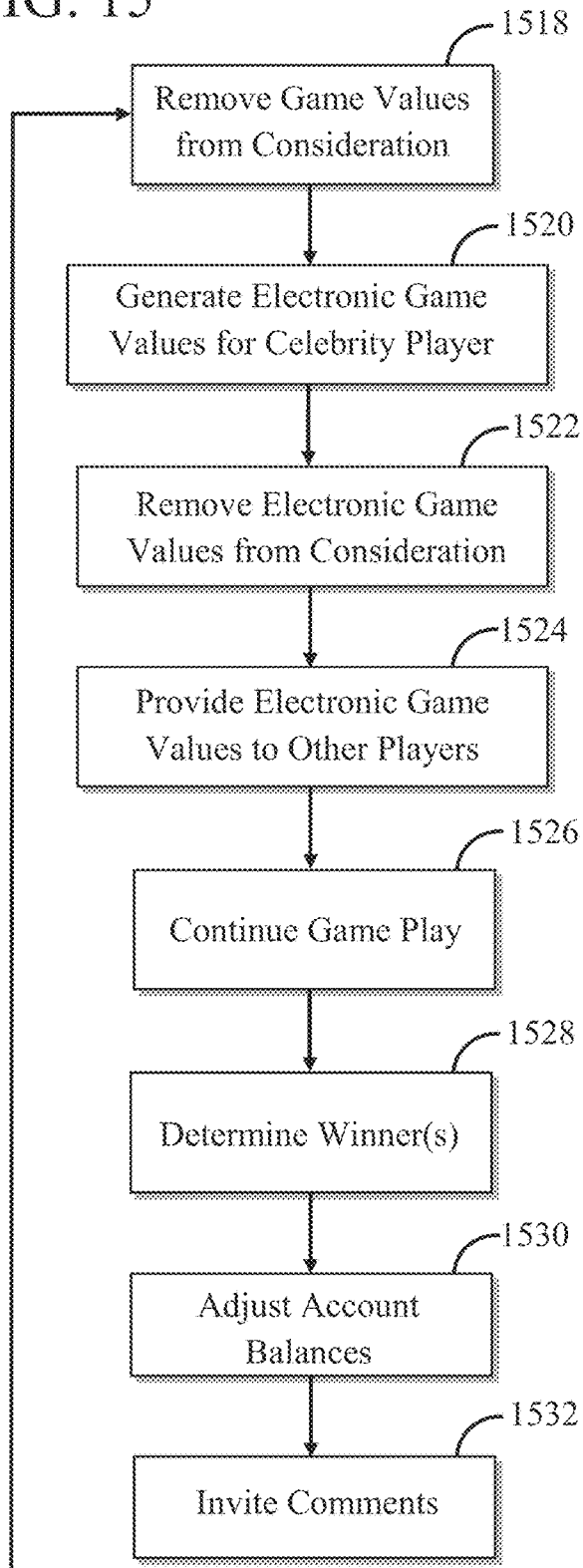

FIG. 15 is a flow diagram 1500 illustrating an embodiment of a multi-table gaming method where a first player may simultaneously participate in a one or more "virtual" games using a network-enabled electronic device (such as a computer, tablet, or smartphone) in communication with gaming server 108, and against one or more players located at a remote location, such as location 102 shown in FIG. 1, and playing on a physical gaming table with a live dealer. Such a player is referred to, in this embodiment, as the "first remote player" or, alternatively, "remote celebrity" or "celebrity player". Each of the virtual games is managed by gaming server 108, offering game play to the first player and remote game players over network 116. In this embodiment, mechanically-generated game values are generated at location 102 and may comprise contingency cards and/or community cards, described in earlier embodiments herein.

Although the method described with respect to FIG. 15 describes two or more game of Texas Hold 'Em, the principles described could be applied to several other types of games, including virtually any other version of poker. It should be understood that the steps described in this method could be performed in an order other than what is shown and discussed, and that some steps may be omitted without departing from the inventive concepts of the invention.

The process described in FIG. 15 may be best used to entice remote player participation in games by allowing one or more celebrity players to participate in one or more virtual games simultaneously, without the celebrity having to be physically located at an authorized gaming establishment, as in the case of the method described in FIG. 12.

In one embodiment, traditional wagering may be altered so that the celebrity player is able to play multiple, simultaneous games against players on multiple virtual gaming tables and at least one physical gaming table, as explained above with respect to the method described by FIG. 12.

In a related embodiment, the celebrity player is provided information pertaining to each virtual gaming table and any physical gaming table that the celebrity is currently active, also described above. For example, a celebrity may be playing against remote players distributed among 8 virtual gaming tables and one physical gaming table at location 102. In this embodiment, the celebrity player is provided information via his or her network-enabled electronic device relating to each virtual gaming table that the celebrity player is involved in as well as the physical gaming table. In another embodiment, the information is provided to a device other than the network-enabled electronic device, such as a television set.

The information may, in one embodiment, comprise a status summary of each game that the celebrity player is active. For example, in a game of Texas Hold 'Em where the celebrity player is playing against remote players at six virtual gaming tables, as well as a physical gaming table, the information may comprise a table summarizing each of the games, using information such as a virtual/physical table identification code (e.g., a table number), a location of other players, the number of players actively participating in any particular game at each table, the number of players who have placed a wager, called, and/or raised during a particular round of play and an identification of which player placed the wager, called, and/or raised, various financial information (such as the amount of a present wager, a dollar amount of the "pot" at each virtual gaming table during game play, etc.), and/or one or more indications of the type of action required from the celebrity player at any particular time during game play (e.g., need to bet or "check" at table 1, need to call, raise, or fold at table 2, etc.).

At block 1502, gaming sever 108 receives an indication from a first player that the first player would like to play a game that is offered by gaming server 108. For purposes of discussion, in this embodiment, the first player comprises a public figure, such as an actor, musician, dancer, business tycoon, poker champion, or any other person that is well-known to the general public. In one embodiment, the indication is provided by a network-enabled electronic device, such as a computer, tablet computer, smartphone, or other device, in response to the first player taking an action, such as entering a game selection into the network-enabled electronic device via a keyboard, mouse, voice-recognition system, etc. The indication may initiate a "new" game, or it may comprise a request to join a virtual game already in progress.

In one embodiment, at block 1504, the first player is authenticated to ensure that the first player is, in fact, the celebrity that he or she purports to be. In one embodiment, the first player provides one or more items of authentication information to gaming server 108 for authentication, such as a username and password, an answer to a pre-arranged "security question", a code sent by gaming server 108 to a token in physical possession of the first player, a fingerprint, a scanned image of the first person's face for processing by a facial identification system, or any other means to authenticate the first player as a celebrity.

In one embodiment, gaming server 108 comprises a database stored in memory 202 listing persons considered to be worthy of "celebrity" status. Gaming server 108 typically compares information in the indication to the pre-defined list to determine whether or not to afford celebrity status to the person providing the indication. If a match is determined by gaming server 108, then the person that provided the indication is given celebrity status, meaning that the person providing the indication may be used to attract other players to play against the person, and/or allow the person to play at one or more virtual gaming tables, as discussed below.

At block 1506, gaming server 108 may provide an indication to a web page hosted by gaming server 108 that the celebrity is going to participate in a game offered by gaming server 108 and that other players may play against the celebrity via gaming server 108. Gaming server 108 may also provide an indication to one or more physical locations, such as location 102, that the celebrity is ready to play games with interested parties. The indication may be provided to dealer interface 118, for example, or it may be sent via email or text message to electronic devices belonging to people who have pre-registered with gaming server 108 and/or a favorite gaming establishment, for example, to receive alerts of this nature.

At block 1508, one or more play requests, or indications, are received by gaming server 108 from remote game players (e.g., players operating network-enabled electronic devices) that wish to play the game with/against the celebrity. Each of the remote game players typically provides such an indication using a web browser running on a respective personal computer, tablet, smartphone, or other network-connected device. Additionally, indications may be received by players located at a physically gaming table, typically located inside an authorized gaming establishment, such as a casino. Indications from such players may be provided be informing a dealer at the physical table, and the dealer using dealer interface 118 to send the indication to gaming server 108.

At block 1510, players are assigned to one or more virtual game tables after gaming server 108 receives the indications, with one of the positions at each virtual gaming table occupied by the celebrity. In one embodiment, game play begins when a predetermined number of players are "seated" at the virtual and/or physical gaming tables. In another embodiment, play beings after a predetermined time period has expired from the time the celebrity provided the indication to play at block 1502. Gaming server 108 also considers players located at one or more physical gaming tables.

The players assigned to each virtual gaming table and/or players at physical gaming tables play the same game type against other players at each virtual/physical gaming table and the celebrity player, respectively. For example, if 27 remote game players wish to join the celebrity in a game of Texas Hold "Em and 9 players wish to join the celebrity in a game of Texas Hold 'Em at a physical location (e.g., a bar authorized for gaming), 3 virtual gaming tables may be created by gaming server 108, each virtual table having 10 player positions. Each table would comprise 9 remote players and the celebrity player. Nine players would be typically seated at designated positions around the physical gaming table. During game play, the celebrity player's game values provided by gaming server 108 are used by the celebrity player against the remote players at each virtual table that was created, and also against each of the players at the physical gaming table. In addition, mechanically-generated game values comprising "community cards" and/or "contingency cards" may be generated at the physical gaming table and provided to some or all the remote players at each virtual table, including the celebrity player, to construct each player's hands during game play.

At block 1512, game play begins. In Texas Hold 'Em, an initial wager is typically received by gaming server 108 from one or more game players at one or more of the three virtual gaming tables (including the celebrity player over network 116) and/or the physical gaming table. For example, a "big blind" and a "small blind" may be received from players at one or more virtual tables and/or from players at the physical gaming table. In other embodiments, additionally or alternatively, one or more "antes" are received from one or more players.

At block 1514, mechanical device 104/detector 106 at location 102 generates a number of physical game values, in this example, physical playing cards, representing initial card hands for players located at the physical gaming table. As the game values are being mechanically-generated, for example a dealer providing physical playing cards to the players, their values are detected by detector 106 and then the values provided to gaming server 108 via network 116. In this example, each player at the physical gaming table receives two cards each from a dealer assigned to the table. In another embodiment, in addition to generating physical game values for players at the physical gaming table, mechanical game values are generated representing any community and/or contingent game values that may be needed to complete game play, as described earlier. "Burn" cards may also be generated.

At block 1516, processor 200 receives the values provided by detector 106 generated at block 1514.

At block 1518, processor 200 excludes the game values that were received at block 1516 from one or more sets of possible game values associated with each virtual gaming table, so that they may not be provided to other players in future action during the round of game play. The exclusion of the received game values may be accomplished by any of the methods described above with respect to FIGS. 3-6 and 10, or any other method for removing, excluding, or eliminating game values from a set of possible game values.

At block 1520, processor 200 generates electronic, random game values for the celebrity player and, at block 1522, excludes these game values from being provided to other remote game players assigned to each virtual gaming table that the celebrity player is engaged. For example, in a game of Texas Hold 'Em, where the celebrity player is playing simultaneously at multiple virtual tables, processor 200 provides the celebrity player two electronic card game values that are excluded from being provided to any other player at any virtual gaming table that the celebrity is active.

At block 1524, after the celebrity's game values are excluded from being provided to other remote players, processor 200 provides each remote player at each of the virtual gaming tables one or more randomly-selected game values from the respective sets of possible game values for each virtual table, excluding any mechanically-generated game values received at block 1516, and further excluding any electronic game values that have already been provided to the celebrity player.

At block 1526, game play continues at each virtual table and the physical gaming table. In general, any further game values needed to complete game play are provided by processor 200 performing the electronic, random game value generation process described above, excluding any mechanically-generated or processor-generated game values already in play. Processor 200 controls game play, typically by providing requests, indications, and/or cues to or from the dealer and/or players to provide responses in the form of game flow (e.g. initiating a betting round) or game play choices (e.g., "hit", "stick", "fold", "call", "raise", wagering amounts, etc.). In Texas Hold 'Em, gaming server 108 reveals the community card values to the players in conformance with the rules of the game and allows wagering to occur as the community card values are revealed. Wagering may be modified, as described above, in order to simplify wagering for the celebrity player.

At block 1528, processor 200 determines one or more game winners for each virtual gaming table and the physical gaming table, based on the scores, values, information, and/or indications of/from each player and/or processor 200.

At block 1530, processor 200 adjusts account balances affected by the game results determined at block 1520, and may provide updated account balances to players.

At block 1532, processor 200 may generate an invitation for winning players to provide comments regarding the previous round of play. In another embodiment, processor 200 provides an indication of winners to the dealer at location 102 via dealer interface 118 and the dealer provides a verbal invitation for winning player(s) to provide comments over communication network 116. In either of the above embodiments, an indication could be provided, either by processor 200 and/or the dealer at location 102, of a general identity and/or location of a player who has received a rare game result, such as receiving a royal flush in a game of draw poker. Winners could respond to the invitation by sending audio/video signals or textual responses to gaming server 108, where they could be forwarded to other game players and/or the dealer. In this way, game players feel more connected to other players and/or the dealer, which may add to their enjoyment of playing games online using gaming system 100.

Figure 16:
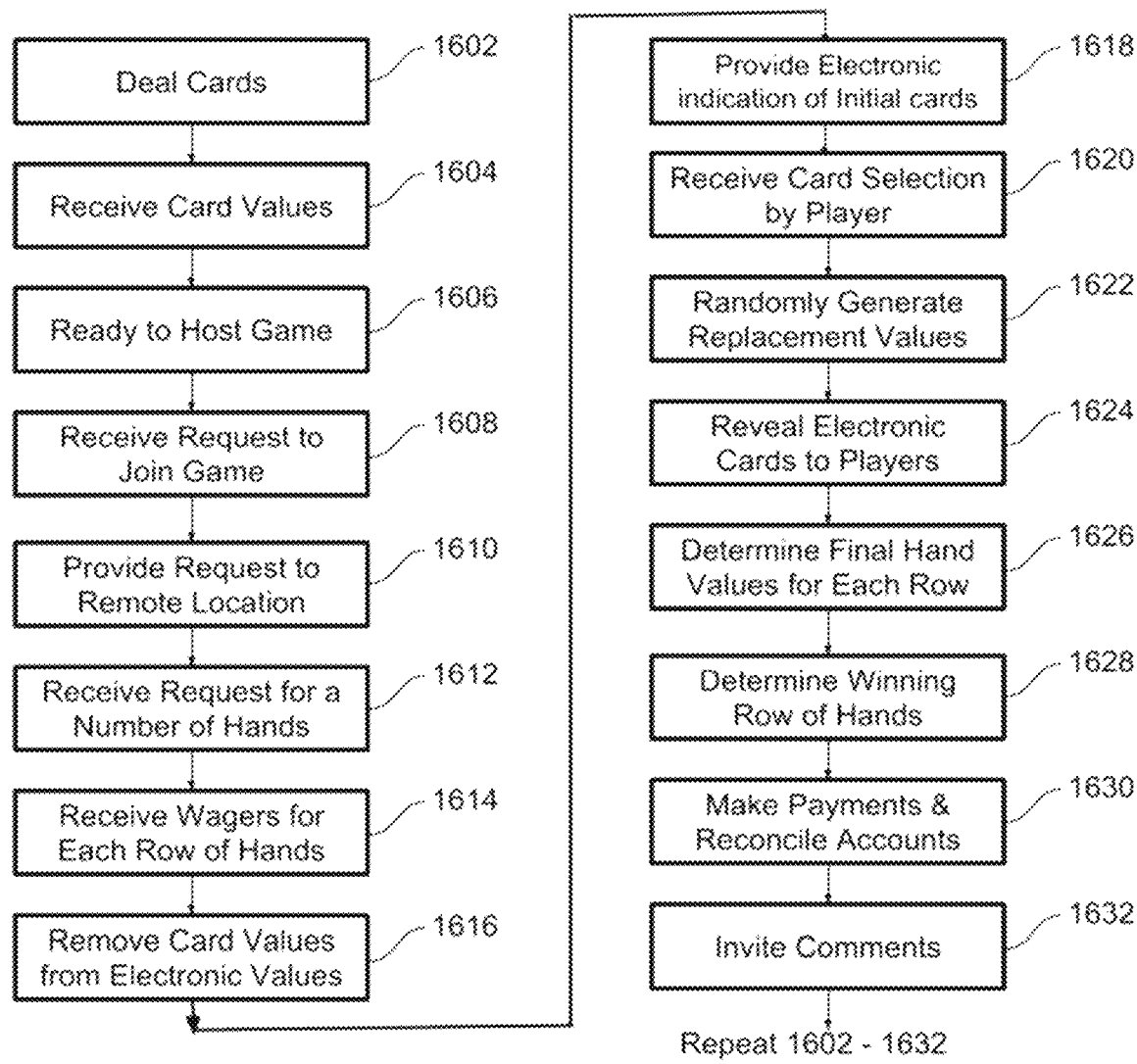
FIG. 16 is a flow diagram illustrating one embodiment of the method of FIG. 3, specifically illustrating a method of how the gaming server of FIG. 2 operates during a multi-hand draw poker game.

FIG. 16 is a flow diagram illustrating one embodiment of a method 600, performed by gaming server 108, for conducting hybrid draw poker games to remote game players over communication network 116. The method is performed as processor 200 executes processor-executable instructions stored in memory 200. It should be understood that the steps described in this method could be performed in an order other than what is shown and discussed, and that some steps may be omitted without departing from the inventive concepts of the invention. It should also be understood that the method may alternatively be performed by a stand-alone, electronic gaming machine comprising a processer, memory, user interface, wager-acceptance mechanism, etc.

Figure 17:
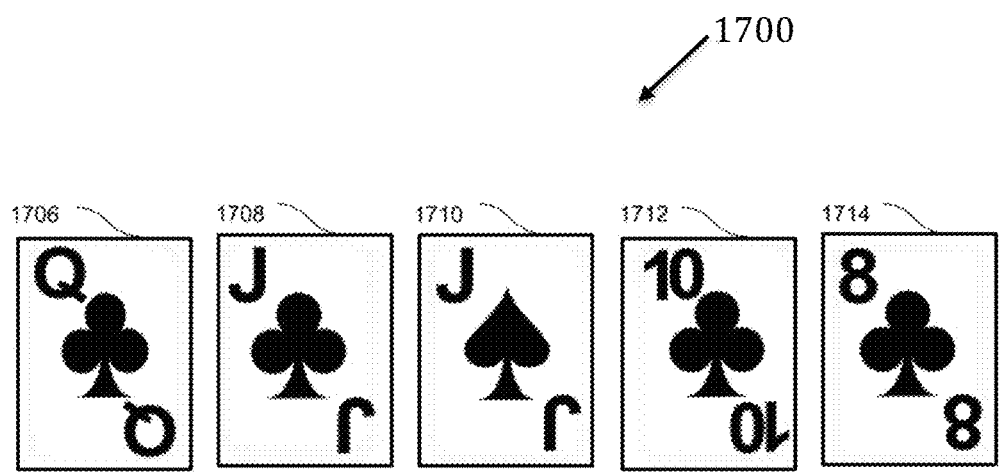
FIG. 17 is an illustration of an initial hand of draw poker dealt by a real, live dealer as an example relating to the method of FIG. 16.

At block 1602, an initial sub-set of physical playing cards 1700 as shown in FIG. 17 are dealt from a deck of physical playing cards by a live or mechanical dealer at remote location 102, representing initial cards for players when the game begins. The number of cards dealt by the dealer could vary depending on the poker game offered, typically five, but could range from three to seven or even more cards. The cards may be dealt face up or face down. In either case, electronic representations of the card values are provided to gaming server 108 via detector 106 and communication network 116, indicating that mechanically-generated game values are available for use by gaming server 108 at block 1604. Typically, the cards are dealt face down so the card values are not disclosed to a camera at location 102. The cards shown in FIG. 17 will be used for the remainder of the discussion with respect to method 1600. As shown, initial cards 1700 comprise the queen of clubs, the jack of clubs, the jack of spades, the ten of clubs, and the nine of clubs.

At block 1606, gaming sever 108 provides an indication that it is ready to host a game of draw poker, such as jacks-or-better, typically by providing a web page having a way for remote game players to sign into the game, register, or otherwise indicate that they would like to participate in game play. At block 1608, one or more players sign up, register, or otherwise provide an indication to gaming server 108 that they would like to participate in the game. In one embodiment, game play begins when a predetermined number of players sign in. In another embodiment, play begins after a predetermined time period has expired after gaming server 108 provides the indication at block 1606. In general, players do not play against each other or the dealer but, rather, attempt to complete game play with a minimum hand value or greater, such as jacks-or-better. In other embodiments, players may request to play using cards dealt by a particular dealer and/or one or more other remote game participants. In these embodiments, server 108 provides game interactions only between/among a remote game player and a selected dealer and/or other remote game players.

In one embodiment, as players provide requests to play the game, processor 200 may assign the players into groups. For example, before game play, processor 200 may define a first group of players as a first number of players who submit a request to play a game and a second group of players comprising a second number of players requesting game play. A group may comprise a single game player. Each of the players in both groups play the same game of jacks-or-better poker using initial card values generated at location 102. However, in one embodiment, one group of players receives electronic, random game values provided from a first set of possible game values by processor 200, and the second group of players receives electronic, random game values provided to the second group from a second set of possible game values. For example, the first group of players may receive electronic, random card values from a first "electronic deck" of cards, e.g., 52 card values relating to an mechanically-generated deck of cards, less any mechanically-generated card values received from location 102 or previously provided to players in the first group. The second group of players may receive electronic, random card values from a second "electronic deck" of cards, e.g., 52 card values relating to an mechanically-generated deck of cards, less any mechanically-generated card values received from location 102 or previously provided to players in the second group.

At block 1610, processor 200 may provide a request to location 102, alerting the dealer and/or mechanical device 106 that game play has commenced, and to reveal the initial cards 1700 to detector 106 and, in some embodiments, a camera so that video images may be provided to players, either through communication network 116 or a second communication network, such as a television network. The request may be presented to a dealer at location 102 via dealer interface 118. At block 1612, processor 200 receives requests from one or more remote game players (i.e., people playing over communication network 116) as to a number of poker hands that each player wishes to play, which could be as many as 100 hands. At block 1614, processor 200 receives wagers from remote game players for each poker hand that each remote game player will play. In one embodiment, processor 200 provides a graphical user interface to each remote game player that allows each remote game player to either place the same wager on each hand, or the ability to place different wagers on different hands. In the former case, processor 200 applies the same wager amount to each of the poker hands (i.e., processer uses the same wager amount to calculate payouts for each poker hand, if any), and in the latter, processor 200 applies different wager amounts to different poker hands as designated by the remote game player (i.e. processor 200 calculates a payout amount on each hand based on each hand's wager amount and game result).

At block 1616, processor 200 excludes the initial sub-set of card values received at block 1604 from further consideration before or during random, electronic card value selection/generation to players, as explained elsewhere herein. In one embodiment, memory 202 comprises a database of all of the card game values that could be played in a game, such as a database of 52 game values, each game value representative of a particular physical playing card in a physical deck of cards. Processor 200 then "removes" or "excludes" game values in the database associated with physical playing cards dealt by the dealer at block 1602. In one embodiment, the entire database of values may be referred to as a full or complete set of card values and the resultant set of card values after removal or exclusion of the initial sub-set of card values may be referred to as a reduced set of electronic card values. Then, when game values are needed during game play, processor 200 randomly selects one or more of the remaining game values from the reduced set of electronic card values.

At block 1618, processor 200 provides the electronic indications of the initial sub-set of physical playing cards dealt at block 1602 to each remote player, and the electronic indications are displayed on a device used by each player to play the game. Typically, the electronic indications are presented as graphical playing cards, showing the value and suit of each of the electronic indications.

At block 1620, processor 200 receives an indication from each player identifying card values (i.e., indications of electronic card values provided to the players at block 1618) to retain and/or card values to discard. For example, a first player may choose to keep the two jacks of initial cards 1700 shown in FIG. 17 in hopes of drawing an additional jack or two jacks, another pair, or another three of a kind. A second player may choose to retain all of the initial cards 1700 except the jack of spades in hopes of drawing a flush, a straight, or a straight flush.

Figure 18A:
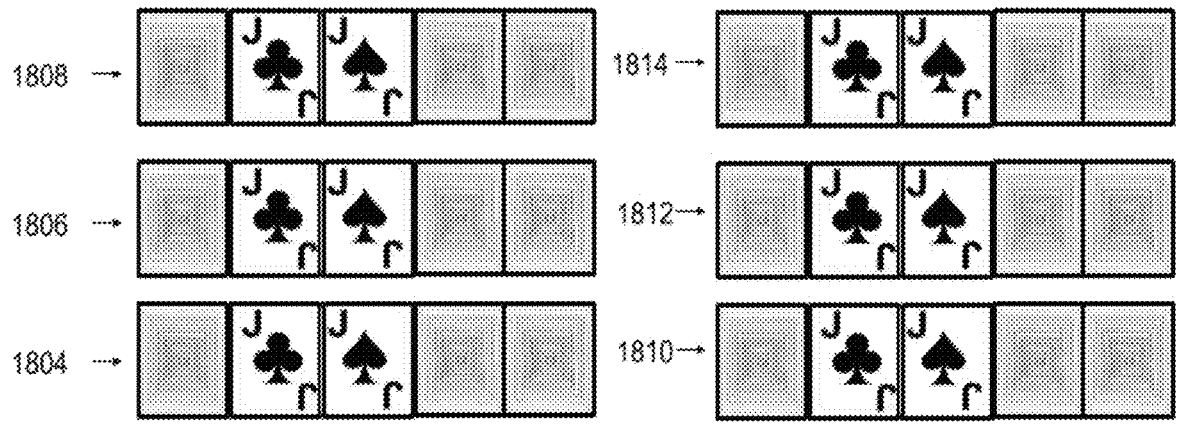
FIG. 18A is an illustration of screen shot of six poker hands with each of two cards retained by an online player shown in each hand.

As shown in FIG. 18A, in one embodiment, processor 200 provides a graphic representation of 6 initial poker hands 1804-1814 provided to a first player in accordance with the first player's desire to play 6 poker hands and retain the jack of spades and the jack of clubs from the initial sub-set of card values. As shown, processor 200 causes the retained card values, i.e., the jack of spades and the jack of clubs, to be duplicated in each hand with the remaining 3 cards of each hand undetermined at this point.

Figure 18B:
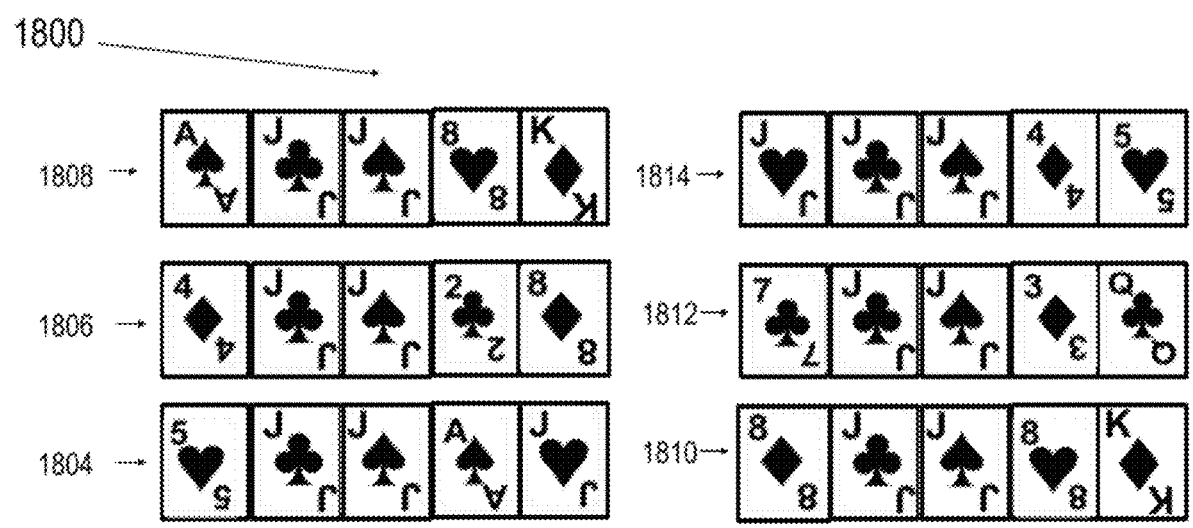
FIG. 18B is an illustration of a screen shot of the six poker hands of FIG. 18A in a final version after the gaming server of FIG. 2 has provided electronic replacement card values to each of the hands.

At block 1622, processor 200 randomly generates/selects electronic replacement card values for the card values discarded by each hand for each player. The card values are then provided to each hand of each of the players via communication network 116 and the virtual gaming environment. In one embodiment, the replacement card values are randomly generated/selected by processor 200 from a full set of card values. In another embodiment, the replacement card values are generated/selected from a reduced set of electronic card values as described at block 1616. At block 1624, processor 200 reveals a number of electronic replacement card values to each hand played by each player, the number of electronic replacement card values in each hand based on the number of initial cards each player has chosen to keep (and/or discard). In the present example, the first player has kept two initial cards, 1708 and 1710, therefore three electronic replacement cards are revealed for each of the 6 hands played by the first player by providing an update to the first player's virtual gaming environment. This creates a final version of each hand, an example shown in FIG. 18B.

At block 1626, processor 200 determines the value of each player's final hands, comprising the retained initial card values associated with the initial sub-set of cards dealt by the dealer at block 1602 and the electronic replacement cards provided by processor 200. In some embodiments, blocks 1620-1622 may be repeated, in an embodiment where players may replace some or all of their card values twice with replacement cards.

At block 1628, in one embodiment, processor 200 evaluates each of the player's final hands to determine whether a minimum card hand value has been achieved or exceeded, such as a pair of jacks. If so, processor 200 awards each player a payoff amount for each hand that meets or exceeds the minimum card hand value in accordance with pre-determined payout information stored within memory 202, at block 1630. In other embodiments, no minimum card hand value is used, and the payout for any final hand is determined by the payout information.

At block 1630, processor 200 and/or the dealer at location 102, may invite the winner(s) of the previous round of play to provide information over communication network 116, the information comprising a still image, video information, or audio information pertaining to the winner. In another embodiment, processor 200 and/or the dealer may invite any player having a final hand equal to or exceeding a rare hand to provide information, for example, if any player's hand comprises four of a kind or a straight flush. The winner(s) could use a web-camera to send a real video and audio signal that is provided to the other game players. For instance, the winner(s) may play fully taunt the other players or provide a comment as to the previous round of play, or any other comments the winner(s) might have. In this way, the game players feel more like they are participating in a real poker game, which may add to their enjoyment of playing games of chance using system 100.

After block 1632, the next round of play may be initiated, i.e., blocks 1602 through 1630 may be repeated, taking into account any new players that have joined the game and any players who have dropped out.

The methods or algorithms described in connection with the embodiments disclosed herein may be embodied directly in hardware, in processor-executable instructions executed by a processor, or in a combination of the two. The processor-executable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, various embodiments of the ideas presented herein may include a computer readable media embodying a code or processor-readable instructions to implement the methods of operation of the system in accordance with the methods, processes, algorithms, blocks and/or functions disclosed herein.

While the foregoing disclosure shows illustrative embodiments of the invention, it should be noted that various changes and modifications could be made herein without departing from the scope of the invention as defined by the appended claims. The functions, blocks and/or actions of the method claims in accordance with the embodiments of the invention described herein need not be performed in any particular order. Furthermore, although elements of the invention may be described or claimed in the singular, the plural is contemplated unless limitation to the singular is explicitly stated. The term "processor 200" and "gaming server 108" used herein is, in many instances, interchangeable.

I claim:

1. A method performed by a gaming server for providing hybrid roulette, comprising:

generating, by a processor, one or more random electronic roulette numbers;

receiving, by the processor via a communication interface coupled to the processor, an electronic indication of a roulette ball landing on a first roulette number of a physical roulette wheel located in a gaming establishment;

receiving, by the processor via the communication interface, a wager from a live player inside the gaming establishment; and determining, by the processor, a roulette game outcome based on the one or more random electronic roulette numbers, the first roulette number and the wager.

2. The method of claim 1, further comprising:

providing, by the processor via the communication interface, the roulette game outcome to a remote roulette player.

3. The method of claim 1, further comprising:

providing, by the processor via the communication interface, the roulette game outcome to a live roulette player inside the gaming establishment.

4. A gaming server for providing hybrid roulette, comprising:

a communication interface for sending and receiving game-related information over a network;

a memory for storing processor-executable instructions; and a processor, coupled to the communication interface and the memory, for executing the processor-executable instructions that causes the gaming server to:

generate, by the processor, one or more random electronic roulette numbers;

receive, by the processor via the communication interface, an electronic indication of a roulette ball landing on a first roulette number of a physical roulette wheel located in a gaming establishment;

receive, by the processor via the communication interface, a wager from a live player inside the gaming establishment; and determine, by the processor, a roulette game outcome based on the one or more random electronic roulette numbers, the first roulette number and the wager.

5. The gaming server of claim 4, wherein the processor-executable instructions comprise further instructions that causes the gaining server to:

provide, by the processor via the communication interface, the outcome to a remote roulette player.

6. The gaming server of claim 4, wherein the processor-executable instructions comprise further instructions that causes the gaming server to:

provide, by the processor via the communication interface, the outcome to a live roulette player inside the gaming establishment.

* * * * *